(12) United States Patent
Katayama

(10) Patent No.: US 11,377,078 B2
(45) Date of Patent: Jul. 5, 2022

(54) OPERATIVE PEDAL DEVICE FOR VEHICLE

(71) Applicant: TOYODA IRON WORKS CO., LTD., Aichi (JP)

(72) Inventor: Takuya Katayama, Aichi (JP)

(73) Assignee: TOYODA IRON WORKS CO., LTD., Aichi (JP)

( * ) Notice: Subject to any disclaimer, the term of this patent is extended or adjusted under 35 U.S.C. 154(b) by 0 days.

(21) Appl. No.: 17/440,454

(22) PCT Filed: Apr. 13, 2020

(86) PCT No.: PCT/JP2020/016310
§ 371 (c)(1),
(2) Date: Sep. 17, 2021

(87) PCT Pub. No.: WO2020/250562
PCT Pub. Date: Dec. 17, 2020

(65) Prior Publication Data
US 2022/0144225 A1 May 12, 2022

(30) Foreign Application Priority Data
Jun. 12, 2019 (JP) .............................. JP2019-109662

(51) Int. Cl.
*B60T 7/06* (2006.01)
*G05G 1/30* (2008.04)
(Continued)

(52) U.S. Cl.
CPC .............. *B60T 7/065* (2013.01); *G05G 1/323* (2013.01); *G05G 1/327* (2013.01)

(58) Field of Classification Search
CPC ............ G05G 1/30; G05G 1/32; G05G 1/323; G05G 1/327; G05G 1/44; B60T 7/06; B60T 7/065
See application file for complete search history.

(56) References Cited

U.S. PATENT DOCUMENTS 9,821,777 B2 * 11/2017 Uchida ................... B60T 7/065
9,889,826 B2 * 2/2018 Periasamy ............... G05G 1/44
(Continued)

FOREIGN PATENT DOCUMENTS

| CN | 1966300 A | * | 5/2007 | ............ B60R 21/09 |
| FR | 2848959 A1 | * | 6/2004 | ............ B60R 21/09 |

(Continued)

OTHER PUBLICATIONS

International Search Report dated Jul. 7, 2020 issued in Patent Application No. PCT/JP2020/016310.

*Primary Examiner* — Adam D Rogers
(74) *Attorney, Agent, or Firm* — Pearne & Gordon LLP

(57) ABSTRACT

Provided is a vehicular operation pedal device having a fail-safe function to prevent backward movement of a step portion of an operation pedal mechanism at the time of a vehicle collision. A brake pedal device (1) includes a protrusion (90) which performs rotation restriction for preventing a rotating member (50) from rotating about a rotating shaft portion (14), and on which a restricting load (F2) acts by the rotation restriction. During the rotation restriction by the protrusion (90), a second load acts as the restricting load (F2) when a step portion (24) of an operation pedal mechanism (20) is fully stepped forward of a vehicle, and when the restricting load (F2) is greater than the second load, the rotation restriction is released due to deformation of the protrusion (90) by shearing or bending.

7 Claims, 19 Drawing Sheets

(51) Int. Cl.
    *G05G 1/323*     (2008.04)
    *G05G 1/327*     (2008.04)

(56) References Cited

U.S. PATENT DOCUMENTS

| | | | |
|---|---|---|---|
| 10,843,650 B2 * | 11/2020 | Stough | B60K 23/02 |
| 2007/0137398 A1 * | 6/2007 | Tokumo | B60T 7/065 |
| | | | 74/512 |
| 2010/0089198 A1 * | 4/2010 | Fujioka | G05G 1/323 |
| | | | 74/594.4 |
| 2019/0092289 A1 * | 3/2019 | Abe | B60T 7/065 |
| 2020/0241587 A1 | 7/2020 | Tsuguma | |

FOREIGN PATENT DOCUMENTS

| | | | |
|---|---|---|---|
| JP | 2003-146193 A | | 5/2003 |
| JP | 2016-139235 A | | 8/2016 |
| JP | 2018-200516 A | | 12/2018 |
| JP | 2019-087190 A | | 6/2019 |
| JP | 2020030561 A | * | 2/2020 |
| WO | WO-2020121589 A1 | * | 6/2020 |

\* cited by examiner

OPERATIVE PEDAL DEVICE FOR VEHICLE

TECHNICAL FIELD

The present invention relates to a vehicular operation pedal device that suppresses a step portion of an operation pedal mechanism from moving back to a vehicle rear side when a vehicle component is displaced to the vehicle rear side due to a vehicle collision (hereinafter, it is referred to as "prevention of backward movement of the step portion of the operation pedal mechanism at the time of the vehicle collision").

BACKGROUND ART

Conventionally, various techniques have been proposed for the vehicular operation pedal device that prevents the backward movement of the step portion of the operation pedal at the time of the vehicle collision.

For example, a technique described in PATENT LITERATURE 1 below is characterized in that in a pedal support structure of a vehicle in which an upper end of a pedal arm is supported by a pedal hanger mounted on a vehicle body via a pedal shaft, and a push rod of a master cylinder provided in an engine room is connected in the middle of the pedal arm, one end of a first link is pivotally supported in the middle of the pedal arm, the other end of the first link is pivotally supported by one end of a second link having the other end engaged with the pedal shaft, the push rod is connected to an intermediate position of the first link, and when the pedal hanger moves relative to a vehicle body mounting portion side due to an excessive input load from a front of the vehicle body, the other end engaging portion of the second link is configured to be detachable from the pedal shaft.

Thus, in a normal state, a pedal arm can be operated independently of a link mechanism, and when an excessive impact load from the front of the vehicle body is applied, the pedal arm can be rotated to the front of the vehicle body via the link mechanism. Therefore, an operation can be reliably performed without complicating the mechanism.

CITATION LIST

Patent Literature

PATENT LITERATURE 1: JP-A-2003-146193

SUMMARY OF INVENTION

Problems to be Solved by Invention

However, in the normal state, if the link mechanism is disengaged from the pedal arm or the pedal shaft due to occurrence of an abnormality, it is difficult to operate the pedal arm.

Therefore, the present invention has been made in view of the above points, and an object of the present invention is to provide a vehicular operation pedal device having a fail-safe function required for preventing the backward movement of the step portion of the operation pedal mechanism at the time of the vehicle collision.

Solution to Problems

In order to address the problem, one embodiment of the present invention is a vehicular operation pedal device which includes: a support member fixed to a first vehicle component; an operation pedal mechanism provided in the support member and having a step portion rotatable with respect to the support member, and in which the step portion is stepped forward of a vehicle; a rotating member having a bent portion, a front end portion extending forward of the vehicle from the bent portion, and an upper end portion extending upward from the bent portion, and rotatably supported with respect to the operation pedal mechanism by a rotating shaft portion at the bent portion; a connecting portion that rotatably holds an input portion of a vehicular control mechanism projecting rearward of the vehicle from the first vehicle component with respect to the rotating member, at the front end portion of the rotating member; and a fixing member that fixes the rotating member and the operation pedal mechanism at the bent portion of the rotating member, and to which a first load is applied when the step portion of the operation pedal mechanism is fully stepped forward of the vehicle. An amount of operation by stepping on the step portion is transmitted to the vehicular control mechanism via the rotating member and the connecting portion, when the first vehicle component is displaced rearward of the vehicle at the time of a vehicle collision, the upper end portion of the rotating member comes into contact with a second vehicle component disposed rearward of the vehicle from the first vehicle component, so that an impact load is applied to the fixing member, and when the impact load is greater than the first load, fixation of the rotating member and the operation pedal mechanism by the fixing member is released, the upper end portion of the rotating member is rotated forward of the vehicle about the rotating shaft portion, and the front end portion of the rotating member and the input portion of the vehicular control mechanism are displaced upward or downward via the connecting portion, so that the step portion of the operation pedal mechanism is displaced forward of the vehicle with respect to the first vehicle component, an operation holding mechanism is provided which performs rotation restriction for preventing the rotating member from rotating about the rotating shaft portion, and on which a restricting load acts by the rotation restriction, and during the rotation restriction in the operation holding mechanism, when the step portion of the operation pedal mechanism is fully stepped forward of the vehicle, a second load acts as the restricting load, and when the restricting load is greater than the second load, the rotation restriction is released due to deformation of the operation holding mechanism.

One embodiment of the present invention is a vehicular operation pedal device, in which the operation holding mechanism is formed in the operation pedal mechanism or the rotating member, and in pressure contact with the operation pedal mechanism, the rotating member, or the connecting portion, so that the restricting load is applied to the operation holding mechanism.

One embodiment of the present invention is the vehicular operation pedal device, in which the operation holding mechanism is a restricting pin that penetrates the rotating member and the operation pedal mechanism.

One embodiment of the present invention is the vehicular operation pedal device, in which in the operation holding mechanism, a portion on which the restricting load acts is separated from the operation pedal mechanism, the rotating member, and the connecting portion until the rotation restriction is started.

One embodiment of the present invention is the vehicular operation pedal device, in which the operation holding mechanism is a protrusion provided protruding from the rotating member and present in an opening formed in the operation pedal mechanism, and the protrusion performs the rotation restriction by hitting an opening edge of the opening, and the restricting load is applied to the protrusion, and when the restricting load is greater than the second load, the protrusion is deformed to release the rotation restriction.

One embodiment of the present invention is the vehicular operation pedal device, in which the operation holding mechanism is a claw portion provided protruding from an edge end of the rotating member, and the claw portion performs the rotation restriction by hitting an outer edge of the operation pedal mechanism, and the restricting load is applied to the claw portion, and when the restricting load is greater than the second load, the claw portion is deformed to release the rotation restriction.

One embodiment of the present invention is the vehicular operation pedal device, in which the connecting portion is penetrated into an opening formed in the operation pedal mechanism, the operation holding mechanism is a projecting piece extending inward of the opening from an opening edge of the opening, and the projecting piece performs the rotation restriction by the connecting portion hitting the projecting piece, and the restricting load is applied to the projecting piece, and when the restricting load is greater than the second load, the projecting piece is deformed to release the rotation restriction.

Effects of Invention

The vehicular operation pedal device of the present invention is provided with a fail-safe function to prevent the backward movement of the step portion of the operation pedal mechanism at the time of the vehicle collision.

DESCRIPTION OF EMBODIMENTS

Figure 1:
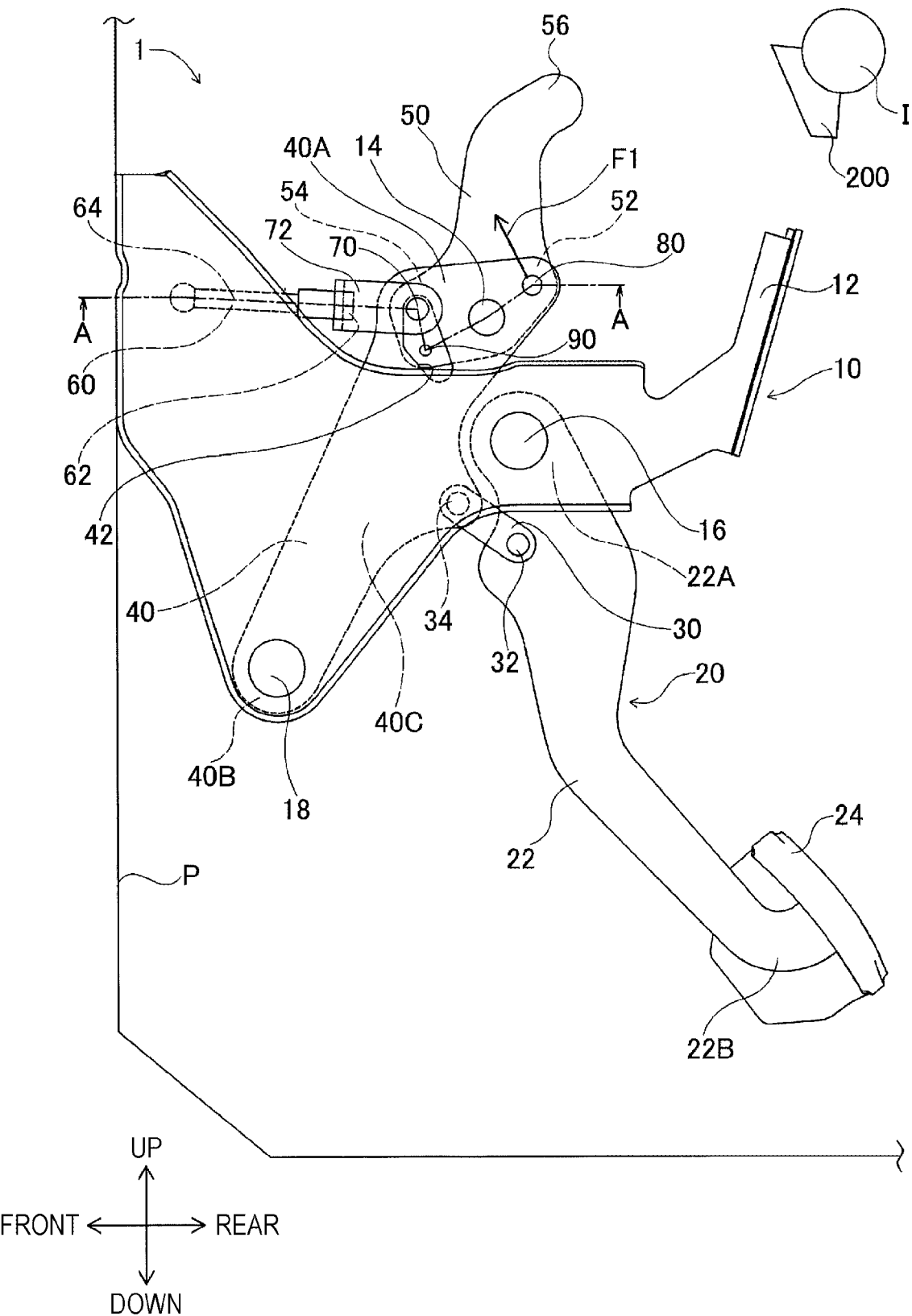
FIG. 1 is a side view illustrating a schematic configuration of a brake pedal device of a first embodiment.

Hereinafter, a vehicular operation pedal device according to the present invention will be described with reference to the drawings on the basis of an embodiment implemented in a brake pedal device for a normal brake. In the drawings used in the following description, a part of a basic configuration is omitted, and a dimensional ratio and the like of each drawn part are not always accurate.

Figure 2:
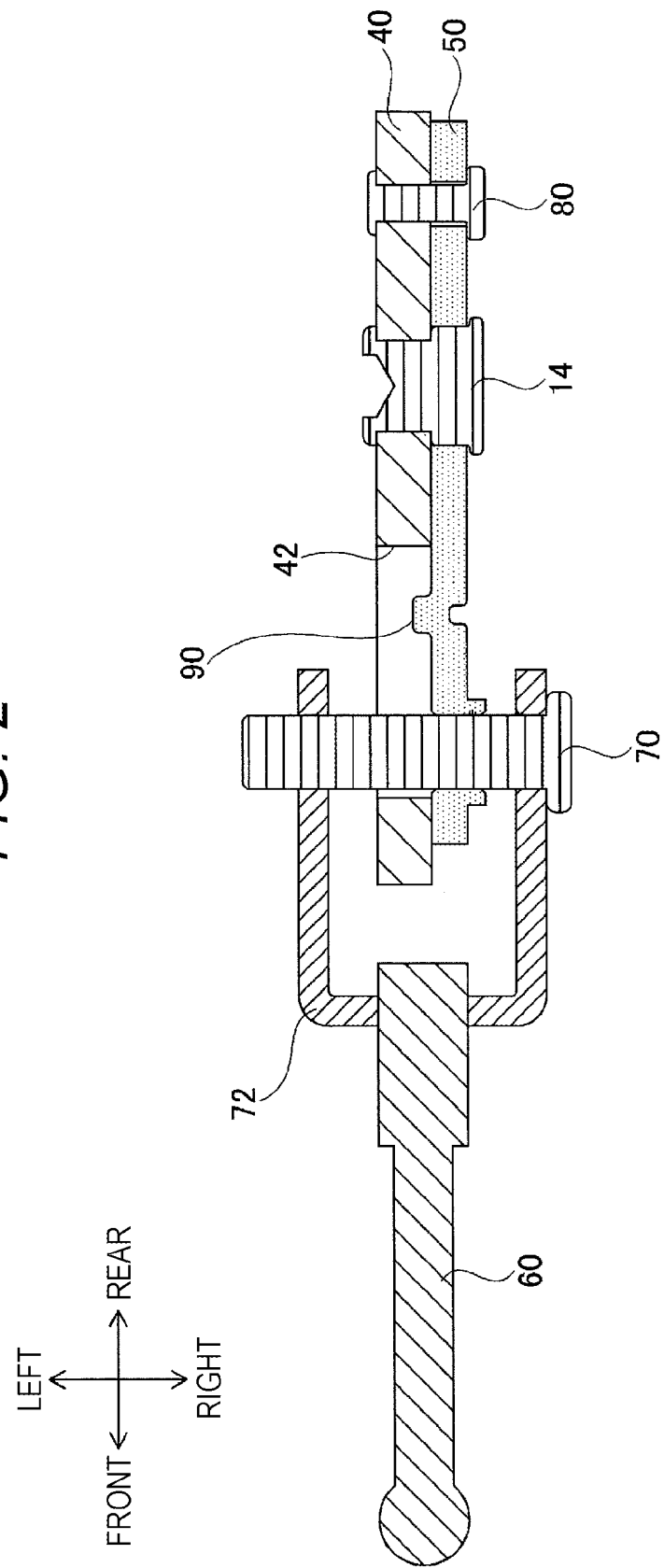
FIG. 2 is a view illustrating a cross-section of the brake pedal device cut along a line A-A of FIG. 1.
Figure 7:
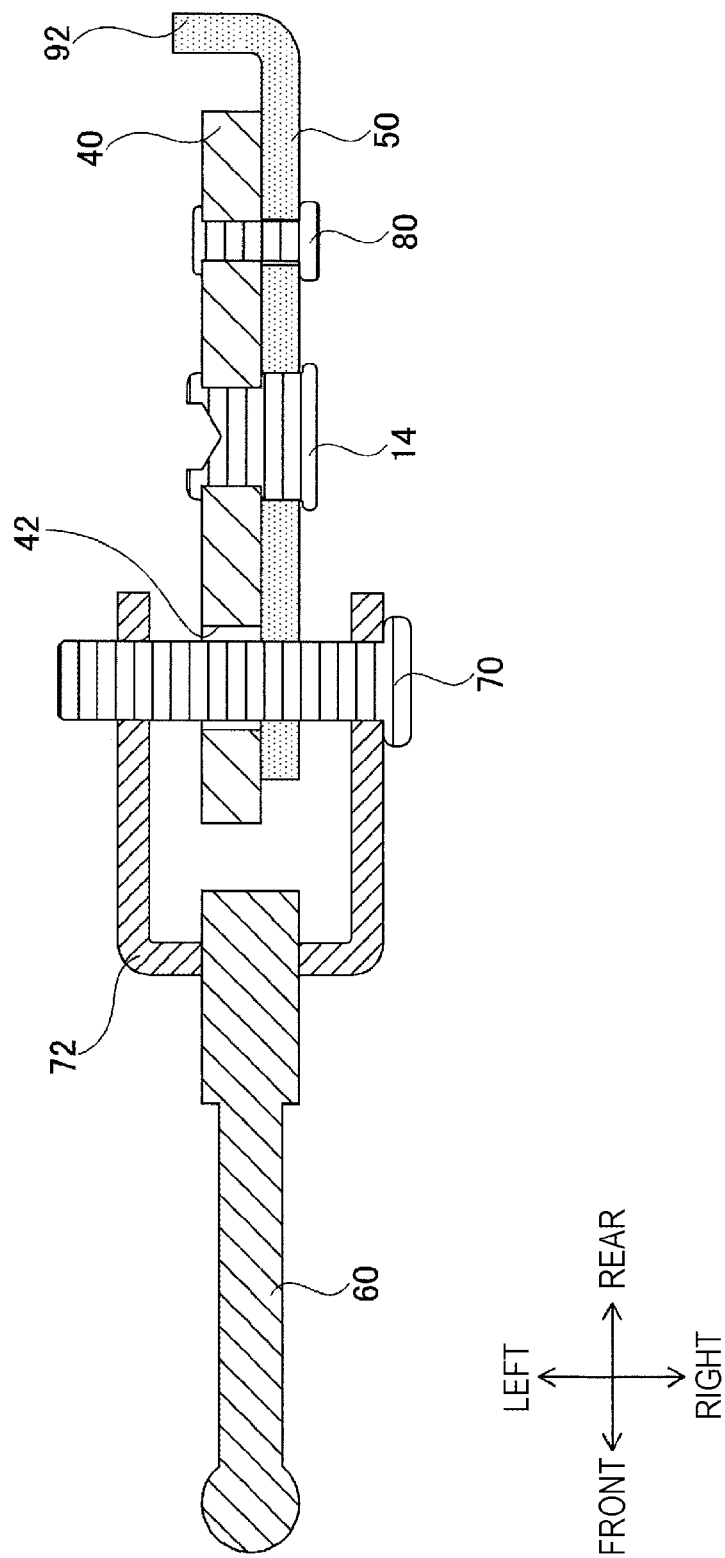
FIG. 7 is a view illustrating a cross-section of the brake pedal device cut along a line B-B of FIG. 5.
Figure 8:
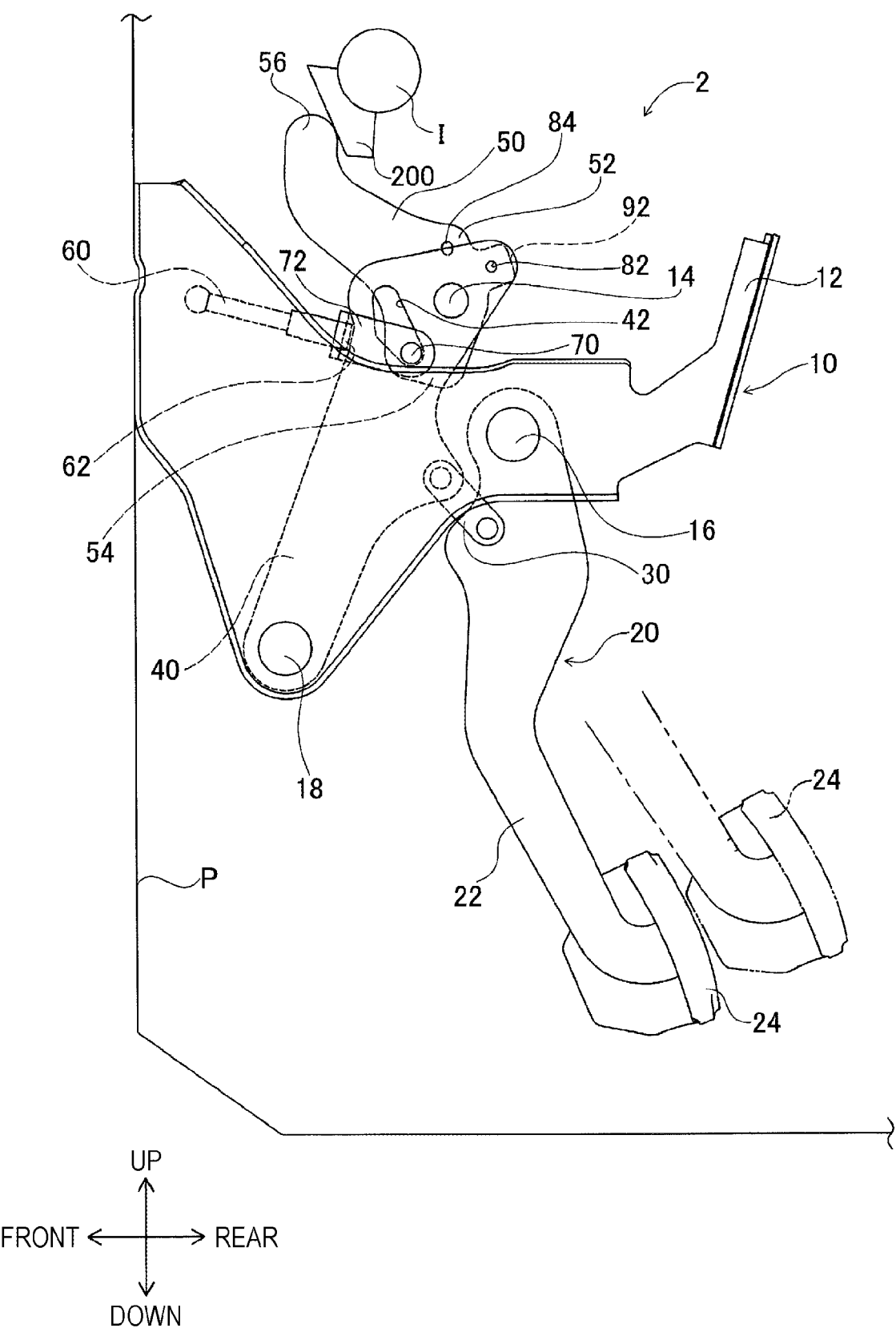
FIG. 8 is a side view illustrating the schematic configuration of the brake pedal device.
Figure 13:
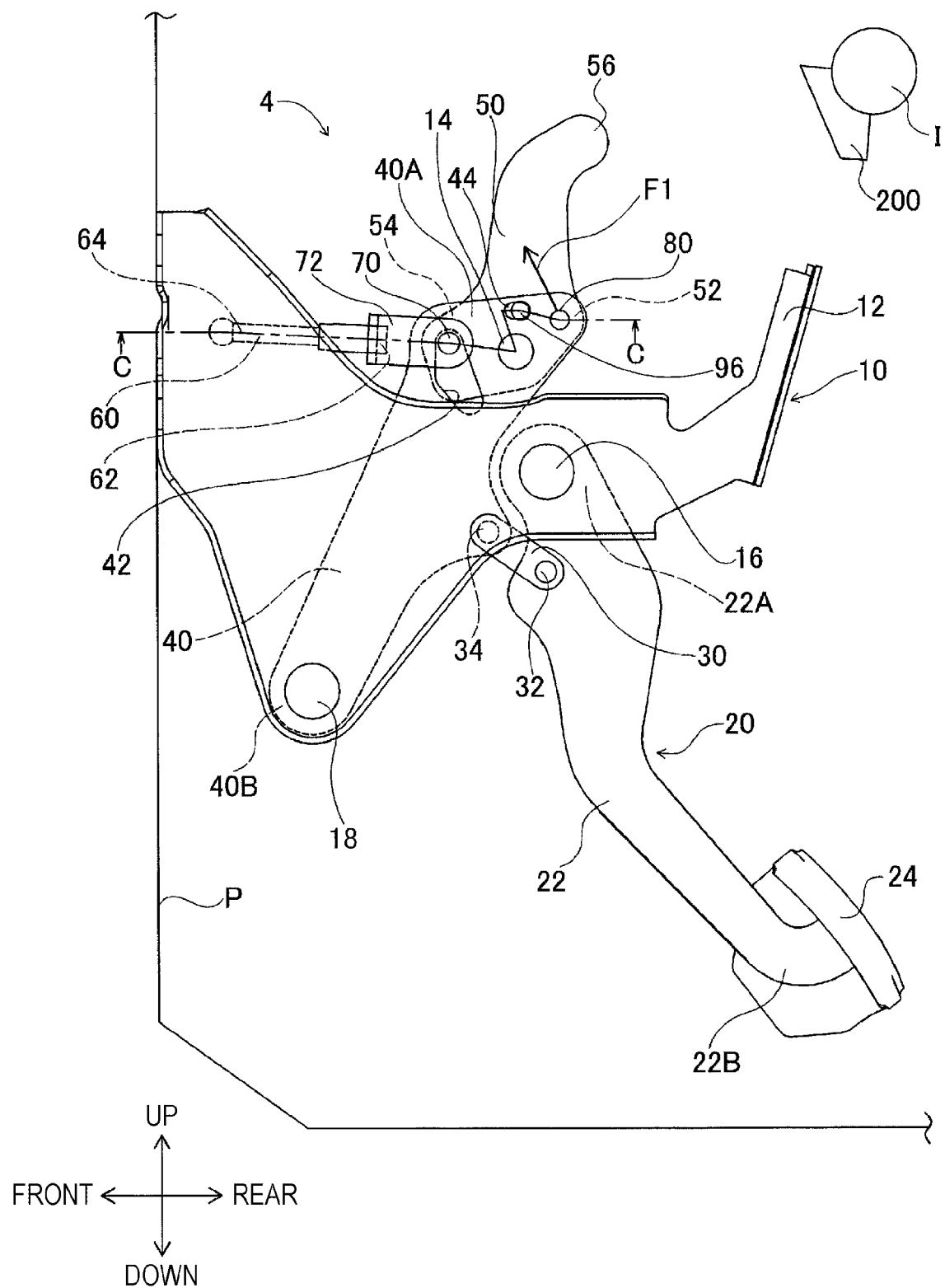
FIG. 13 is a side view illustrating the schematic configuration of the brake pedal device according to a fourth embodiment.
Figure 14:
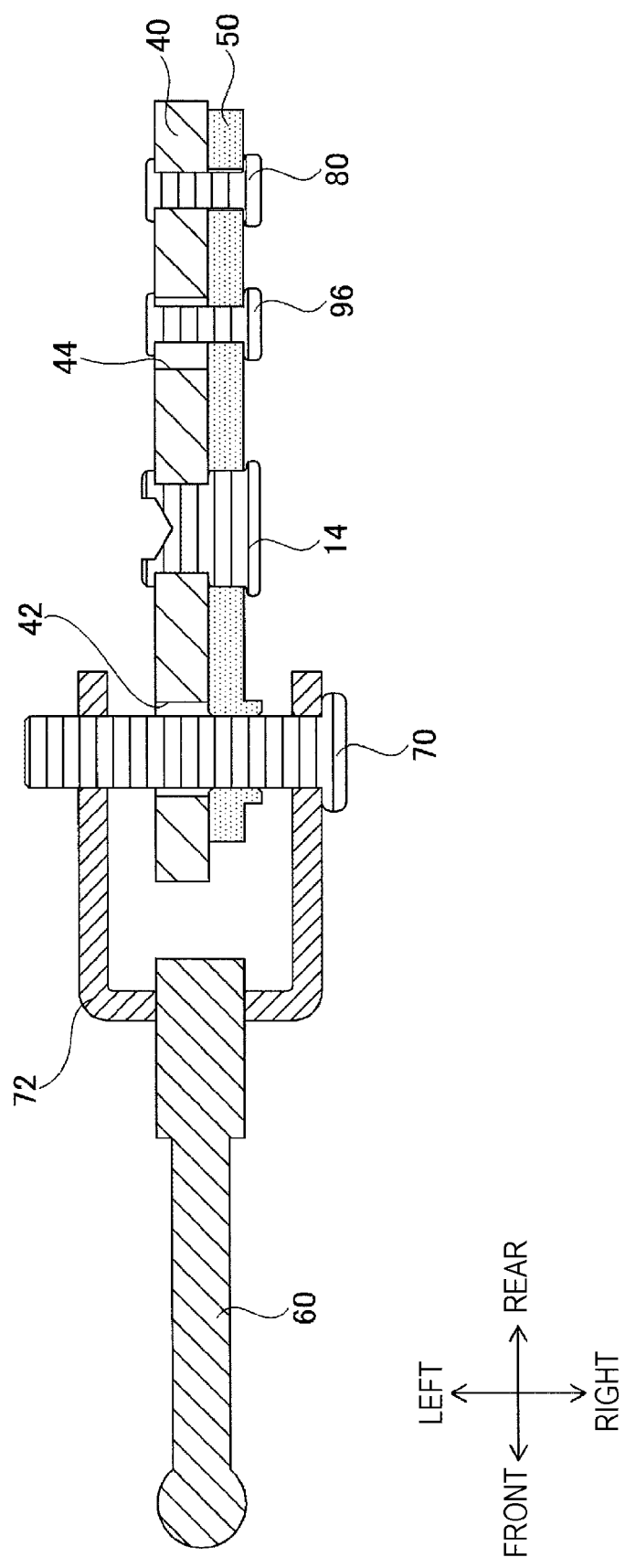
FIG. 14 is a view illustrating a cross-section of the brake pedal device cut along a line C-C of FIG. 13.
Figure 15:
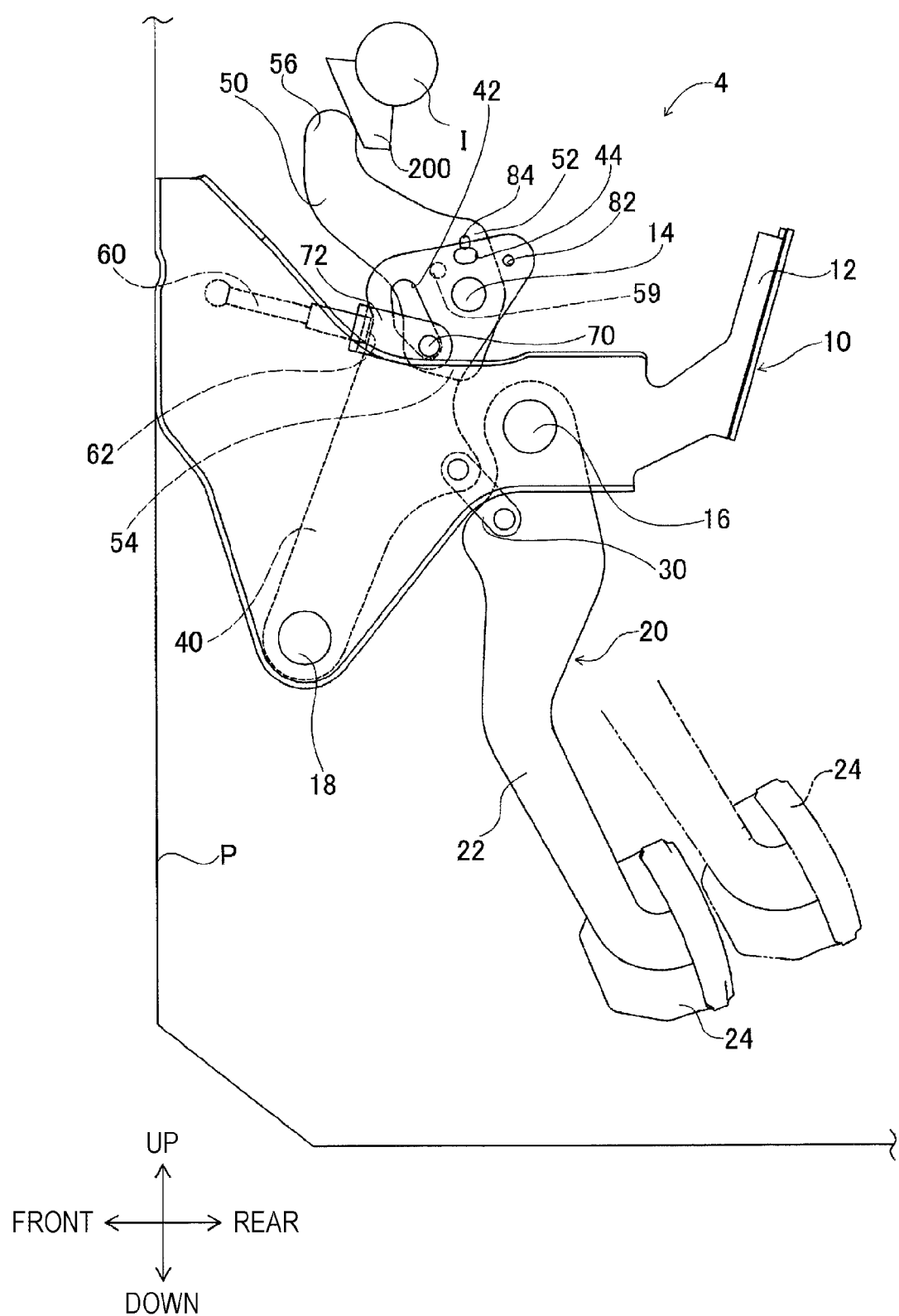
FIG. 15 is a side view illustrating the schematic configuration of the brake pedal device.

In the drawings, a front-rear direction, an up-down direction, and a left-right direction are as described in the drawings. However, in FIGS. 1, 3 to 5, 8 to 13, and 15 to 19, a back side of paper surface of the drawing is a right direction, and a front side of the paper surface of the drawing is a left direction. In FIGS. 2, 7 and 14, the back side of the paper surface of the drawing is an upward direction, and the front side of the paper surface of the drawing is a downward direction.

In the following description, a front direction is described as a "vehicle front side", a rear direction is described as a "vehicle rear side", the upward direction is described as a "vehicle upper side", and the downward direction is described as a "vehicle lower side". In addition, the left-right direction is described as a "vehicle width direction".

(1-1) Overview of First Embodiment.

First, a first embodiment will be described. As illustrated in FIGS. 1 and 2, a brake pedal device 1 of the first embodiment is made of metal and includes a pedal bracket 10, an operation pedal mechanism 20, a rotating member 50, a caulking pin 80, and the like.

The pedal bracket 10 has a pair of side plates 12. The pair of side plates 12 face each other at a predetermined interval in the vehicle width direction, and are fixed to a dash panel P with bolts or the like. The dash panel P constitutes a part of the vehicle and is located on the vehicle front side from the operation pedal mechanism 20. The operation pedal mechanism 20, the rotating member 50, the caulking pin 80, and the like are arranged between the pair of side plates 12.

In FIG. 1, of the pair of side plates 12, the side plate 12 on the left side in the vehicle width direction is illustrated, and the side plate 12 on the right side in the vehicle width direction is not illustrated. This point is the same in FIGS. 3 to 5, 8 to 13, and 15 to 19 described below.

The operation pedal mechanism 20 is a so-called link type operation pedal mechanism, and includes an operation pedal 22, a link member 30, an intermediate lever 40, and the like. The operation pedal 22 is rotatably supported with respect to the pedal bracket 10 by an operating shaft portion 16 provided at an upper end portion 22A of the operation pedal. A step portion 24 is provided on a lower end portion 22B of the operation pedal 22. Thus, the step portion 24 is rotatable with respect to the pedal bracket 10 and can be stepped forward of the vehicle by a driver of the vehicle. The vehicle is controlled according to an amount of operation (pedal stroke, pedaling force, or the like) by the stepping on the step portion 24. Vehicle control performed by stepping on the step portion 24 in this way is referred to as a stepping operation on the step portion 24 of the operation pedal mechanism 20.

The intermediate lever 40 is rotatably supported with respect to the pedal bracket 10 by an intermediate shaft portion 18 provided in a lower end portion 40B of the intermediate lever 40. A rotating shaft portion 14 and the caulking pin 80 are provided in an upper end portion 40A of the intermediate lever 40. Further, the upper end portion 40A of the intermediate lever 40 is provided with an opening 42 on the vehicle front side with respect to the rotating shaft portion 14 and the caulking pin 80. The opening 42 is inclined toward the vehicle lower side as it goes to the vehicle rear side. An intermediate portion 40C of the intermediate lever 40 is connected to the operation pedal 22 by the link member 30, between the upper end portion 22A and the lower end portion 22B of the operation pedal 22.

The link member 30 has a first link pin 32 and a second link pin 34. The first link pin 32 is provided at a vehicle rear portion of the link member 30, and connects the link member 30 and the operation pedal 22. On the other hand, the second link pin 34 is provided in a vehicle front portion of the link member 30, and connects the link member 30 and the intermediate lever 40.

The rotating member 50 is made of a metal plate material and has an L-shape when viewed from the left side in the vehicle width direction. The rotating member 50 has a bent portion 52, a front end portion 54, and an upper end portion 56.

The bent portion 52 of the rotating member 50 is a central portion of the rotating member 50, and is a bent portion of the rotating member 50. The above-mentioned rotating shaft portion 14 and caulking pin 80 are provided in the bent portion The rotating shaft portion 14 and the caulking pin 80 are caulked so as not to come off from the bent portion 52 of the rotating member 50 and the upper end portion 40A of the intermediate lever 40. Thus, the rotating shaft portion 14 and the caulking pin 80 fix the rotating member 50 to the intermediate lever 40. Strength of the caulking pin 80 is made smaller than that of the rotating shaft portion 14. For example, as illustrated in FIG. 2, shear strength of the caulking pin 80 is made smaller than that of the rotating shaft portion 14 by making shaft diameter of the caulking pin 80 smaller than that of the rotating shaft portion 14. Alternatively, the caulking pin 80 may be made of a material having a tensile strength less than that of material of the rotating shaft portion 14. Therefore, when the caulking pin 80 is deformed or deformed and broken (hereinafter, referred to as "breakage") and thus the fixation of the rotating member 50 and the intermediate lever 40 by the caulking pin 80 is released, the rotating member 50 can rotate with respect to the intermediate lever 40 about the rotating shaft portion 14. The rotating shaft portion 14 is provided with a step slightly greater than a plate thickness of the intermediate lever 40, so that frictional resistance when the intermediate lever 40 rotates is reduced.

Note that the rotating member 50 is on the right side in the vehicle width direction and the intermediate lever 40 is on the left side in the vehicle width direction, however, unlike the first embodiment, the rotating member 50 may be on the left side in the vehicle width direction and the intermediate lever 40 may be on the right side in the vehicle width direction.

The front end portion 54 of the rotating member 50 is a portion of the rotating member 50 extending forward of the vehicle from the bent portion 52. At the front end portion 54, a tip portion 62 of an operating rod 60 is rotatably held via a connecting pin 70 and a clevis 72. Further, the rotating shaft portion 14 and the caulking pin 80 are arranged near a line extending an axis 64 of the operating rod 60 from the connecting pin 70 to the vehicle rear side (hereinafter, referred to as "an extension line of the axis 64 of the operating rod 60"). In this respect, the rotating shaft portion 14 is disposed slightly on the vehicle lower side of the extension line of the axis 64 of the operating rod 60. On the other hand, the caulking pin 80 is arranged on the vehicle upper side with respect to the extension line of the axis 64 of the operating rod 60. However, the rotating shaft portion 14 and the caulking pin 80 may be arranged on the extension line of the axis 64 of the operating rod 60.

The operating rod 60 projects rearward of the vehicle from the dash panel P via a brake booster (not illustrated), and a projecting direction thereof can be freely changed. The connecting pin 70 is in a state of being penetrated into a vehicle upper portion in the opening 42 formed in the upper end portion 40A of the intermediate lever 40, and is prevented from coming off from the front end portion 54 of the rotating member 50, the opening 42 of the upper end portion 40A of the intermediate lever 40, and the clevis 72 by a clip (not illustrated).

The front end portion 54 of the rotating member 50 is provided with a protrusion 90 at a portion exposed from the opening 42 of the intermediate lever 40 when viewed from the left side in the vehicle width direction. The protrusion 90 protrudes to the left side in the vehicle width direction. Thus, the protrusion 90 is disposed on the vehicle lower side of the connecting pin 70 in a state of being separated from an opening edge of the opening 42, in the opening 42 of the intermediate lever 40. Note that the protrusion 90 may be provided, for example, by press working, or may be provided by press-fitting a member other than the rotating member 50 into the rotating member 50.

The upper end portion 56 of the rotating member 50 is a portion of the rotating member 50 extending upward of the vehicle from the bent portion 52. On the vehicle rear side from the upper end portion 56, there is an elongated instrument panel reinforcement I provided so that a longitudinal direction thereof is in the vehicle width direction. Therefore, the instrument panel reinforcement I is located on the vehicle rear side from the dash panel P. The instrument panel reinforcement I constitutes a part of the vehicle, and has a collision bracket 200 and the like. The collision bracket 200 is fixedly installed from the front end portion to the lower end portion of the instrument panel reinforcement I. The collision bracket 200 is provided to contact the upper end portion 56 of the rotating member 50 at the time of the vehicle collision. On the vehicle front side of the collision bracket 200, a contact surface portion for contacting the upper end portion 56 of the rotating member 50 is provided so that the rotating member 50 can be easily displaced forward of the vehicle. In the rotating member 50, the upper end portion 56 extends in a direction in which there is the instrument panel reinforcement I from the axis 64 of the operating rod 60, and a portion that contacts the contact surface portion of the collision bracket 200 has a curved shape.

Note that the rotating shaft portion 14, the operating shaft portion 16, the intermediate shaft portion 18, the first link pin 32, the second link pin 34, the connecting pin 70, and the caulking pin 80 are provided in a state of being substantially horizontal and substantially parallel to the vehicle width direction, between the pair of side plates 12.

(1-2) Operation of First Embodiment in Normal Times

In normal times, when the step portion 24 is stepped forward of the vehicle, the operation pedal 22 rotates about the operating shaft portion 16. At this time, since the operation pedal 22 rotates in a predetermined direction (clockwise direction in FIG. 1) about the operating shaft portion 16, rotation of the operation pedal 22 is transmitted to the intermediate lever 40 via the link member 30.

Therefore, the intermediate lever 40 rotates in a predetermined direction (counterclockwise direction in FIG. 1) about the intermediate shaft portion 18 as the operation pedal 22 rotates. Therefore, the rotating member 50 and the operating rod 60 are displaced forward of the vehicle.

When the operating rod 60 is displaced forward of the vehicle as the step portion 24 is stepped forward of the vehicle, the operating rod 60 transmits an operating force at the time of stepping on to a braking device or a control device that controls the operating state of the vehicle through a hydraulic circuit, an electronic circuit, or the like. In this way, the stepping operation on the step portion 24 of the operation pedal mechanism 20 is performed.

At that time, a reaction force from the operating rod 60 acts on the rotating member 50 via the connecting pin 70, and since the caulking pin 80 is deviated from the extension line of the axis 64 of the operating rod 60, a load acts on the caulking pin 80. The load acting on the caulking pin 80 by transmitting the reaction force from the operating rod 60 to the caulking pin 80 via the connecting pin 70 and the rotating member 50 in this way is called a fixed load. Reference numeral F1 indicates the fixed load.

Note that when the step portion 24 is stepped forward of the vehicle by an operating load of the driver, and when the step portion 24 is further stepped forward of the vehicle, so that the operating load acting on the step portion 24 is increased, the fixed load acting on the caulking pin 80 is also increased. Therefore, when the step portion 24 is fully stepped forward of the vehicle and the operating load is the maximum in design, the fixed load acting on the caulking pin 80 is defined as a first load.

(1-3) Operation of First Embodiment at the Time of Vehicle Collision

When the dash panel P is displaced rearward of the vehicle at the time of the vehicle collision, the collision bracket 200 of the instrument panel reinforcement I hits the rotating member 50. Even in such a case, the load is applied to the caulking pin 80. The load acting on the caulking pin 80 in this way is called an impact load. In such a case, the reference numeral F1 indicates the impact load instead of the fixed load described above.

Then, when the impact load exceeds a first reference load greater than the first load, since the caulking pin 80 is broken by the impact load, the caulking pin 80 comes off from the rotating member 50 and the intermediate lever 40. Thus, fixation of the rotating member 50 and the intermediate lever 40 by the caulking pin 80 is released.

Figure 3:
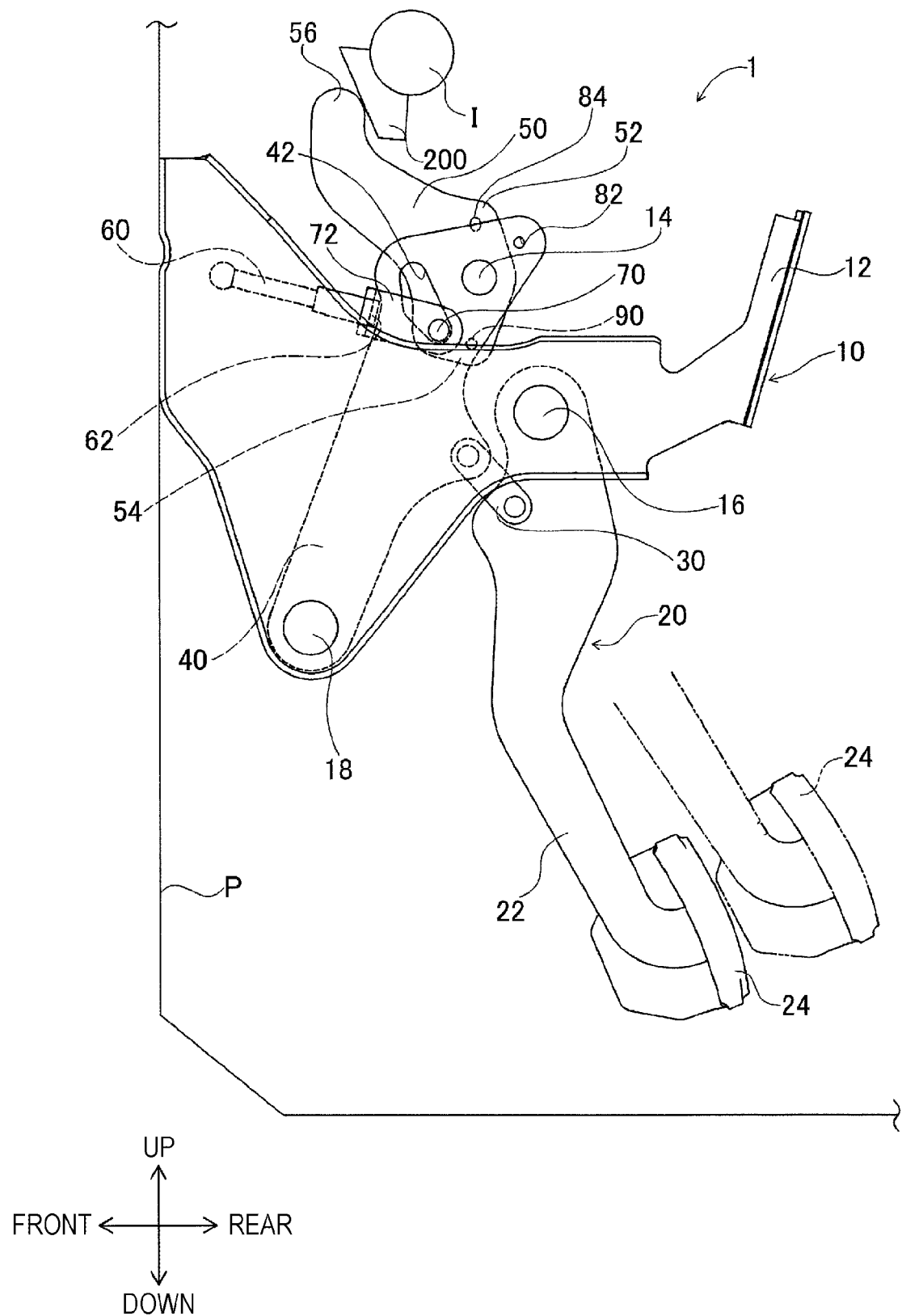
FIG. 3 is a side view illustrating the schematic configuration of the brake pedal device.

Further, as illustrated in FIG. 3, the rotating member 50 is pushed forward of the vehicle by the collision bracket 200, so that the upper end portion 56 of the rotating member 50 is rotated forward (counterclockwise direction in FIG. 3) of the vehicle about the rotating shaft portion 14. At the same time, the front end portion 54 of the rotating member 50 and the tip portion 62 of the operating rod 60 are displaced downward of the vehicle via the connecting pin 70 and the clevis 72. At that time, since the intermediate lever 40 is rotated forward (counterclockwise direction in FIG. 3) of the vehicle, the step portion 24 of the operation pedal 22 is displaced forward of the vehicle.

As described above in detail, in the brake pedal device 1 of the first embodiment, the rotating member 50 and the caulking pin 80 are added to a so-called link type operation pedal mechanism 20, so that prevention of backward movement of the step portion 24 of the operation pedal mechanism 20 at the time of the vehicle collision is achieved.

Note that, reference numerals 82 and 84 indicate mounting holes for inserting the caulking pin 80 therethrough. The mounting hole 82 is provided in the upper end portion 40A of the intermediate lever 40, and is formed in a round hole into which the caulking pin 80 can be fitted. On the other hand, the mounting hole 84 is provided in the bent portion 52 of the rotating member 50, and is formed in an elongated hole through which the caulking pin 80 can penetrate. Misalignment that occurs between the mounting hole 82 and the mounting hole 84 is absorbed by such a difference in hole shape. However, unlike the first embodiment, the mounting hole 82 provided in the upper end portion 40A of the intermediate lever 40 may be the elongated hole, and the mounting hole 84 provided in the bent portion 52 of the rotating member 50 may be the round hole. Further, the step portion 24 illustrated by a two-dot chain line indicates a position of the step portion 24 when the stepping operation on the step portion 24 of the operation pedal mechanism 20 is released.

Further, unlike FIG. 3, even if the upper end portion 56 of the rotating member 50 is rotated rearward of the vehicle (clockwise direction in FIG. 3) about the rotating shaft portion 14, and at the same time, the front end portion 54 of the rotating member 50 and the tip portion 62 of the operating rod 60 is displaced upward of the vehicle via the connecting pin 70 and the clevis 72, it is possible to prevent the backward movement of the step portion 24 of the operation pedal mechanism 20 at the time of the vehicle collision.

(1-4) Operation of the First Embodiment when the Caulking Pin 80 is Broken in Normal Times Even in normal times, if the caulking pin 80 is in a broken state due to some factor, the rotating member 50 can rotate with respect to the intermediate lever 40 about the rotating shaft portion 14. Therefore, in such a state, when the step portion 24 is stepped forward of the vehicle by the driver, the intermediate lever 40 rotates about the intermediate shaft portion 18 in a predetermined direction (counterclockwise direction in FIG. 1), and the reaction force from the operating rod 60 acts on the rotating member 50 via the connecting pin 70, the upper end portion 56 of the rotating member 50 rotates forward of the vehicle about the rotating shaft portion 14 (hereinafter, such rotation is referred to as "rotation of the rotating member 50 about the rotating shaft portion 14"). At the same time, the front end portion 54 of the rotating member 50 and the tip portion 62 of the operating rod 60 are displaced downward of the vehicle via the connecting pin 70 and the clevis 72. Therefore, the stepping operation on the step portion 24 of the operation pedal mechanism 20 is in a state of idling.

Figure 4:
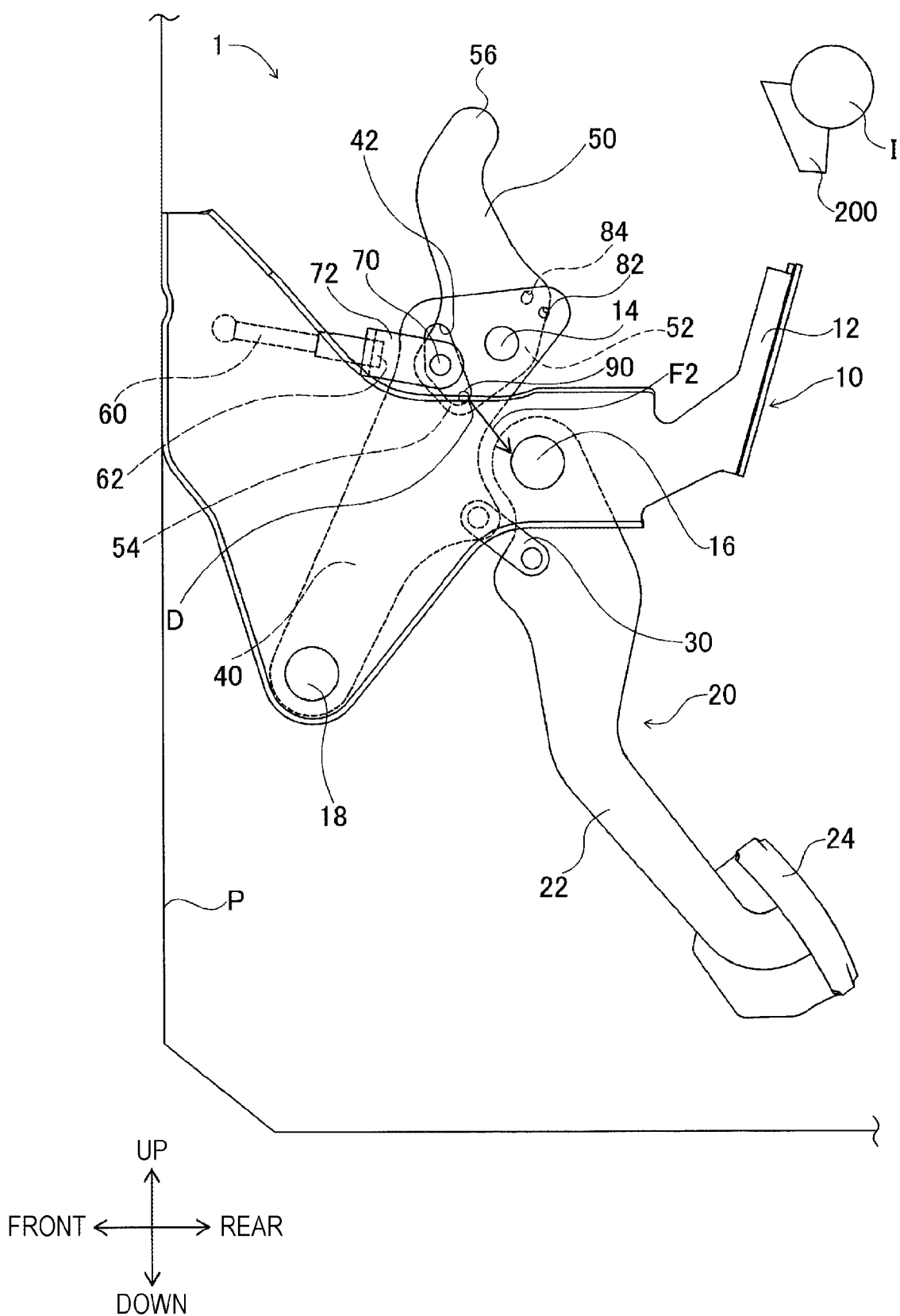
FIG. 4 is a side view illustrating the schematic configuration of the brake pedal device.
Figure 5:
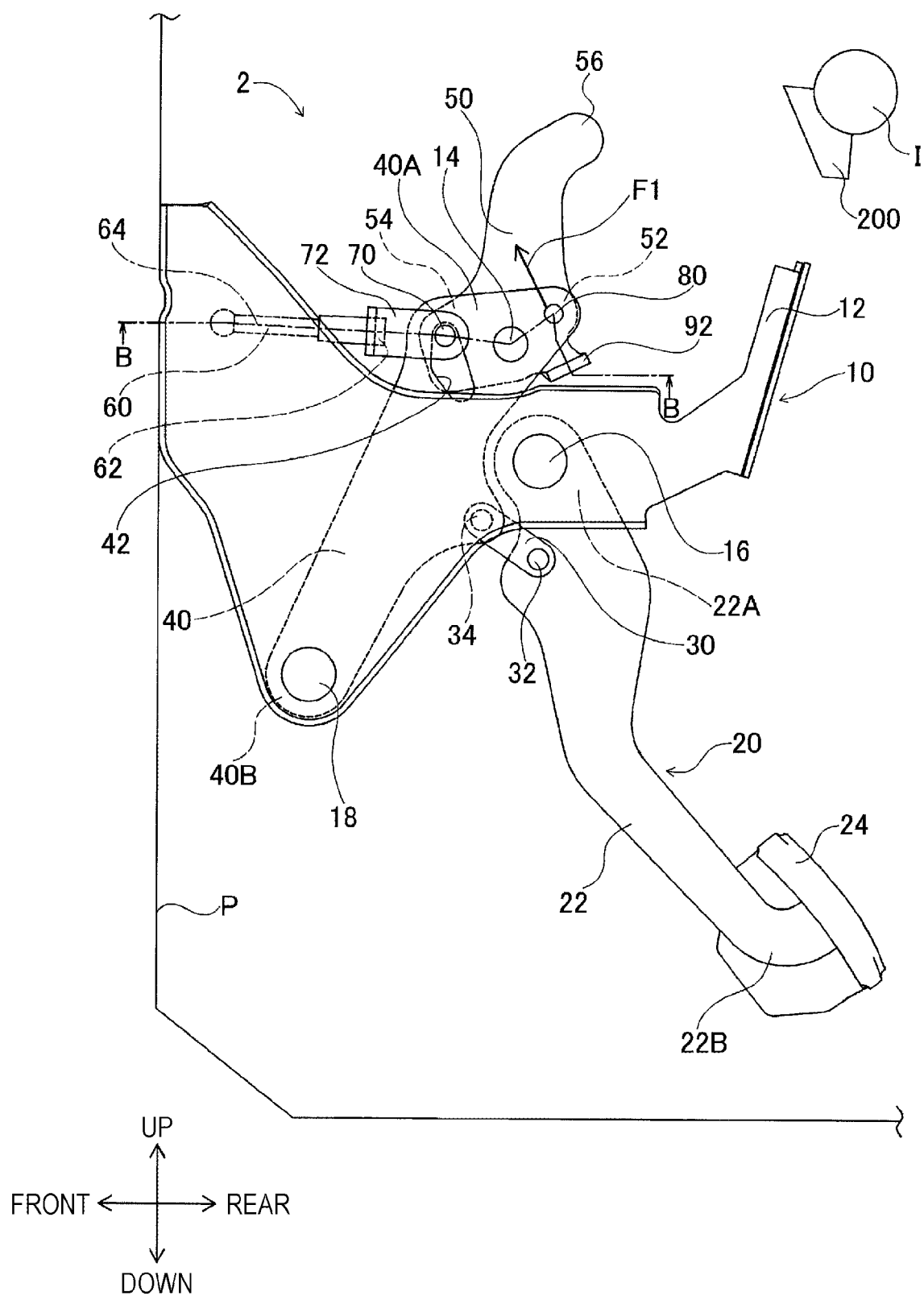
FIG. 5 is a side view illustrating the schematic configuration of the brake pedal device of a second embodiment.

However, when the step portion 24 is further stepped forward of the vehicle by the driver to rotate the rotating member 50 about the rotating shaft portion 14, since the protrusion 90 protruding from the front end portion 54 of the rotating member 50 hits the opening edge of the opening 42 of the intermediate lever 40 as illustrated in FIG. 4, the rotation of the rotating member 50 about the rotating shaft portion 14 is restricted.

In such a state, when the step portion 24 is further stepped forward of the vehicle by the driver, the rotating member 50 is displaced forward of the vehicle together with the intermediate lever 40 rotating in a predetermined direction (counterclockwise direction in FIG. 4) about the intermediate shaft portion 18. Thus, the front end portion 54 of the rotating member 50 and the tip portion 62 of the operating rod 60 are displaced forward of the vehicle via the connecting pin 70 and the clevis 72. Therefore, it is possible to perform the stepping operation on the step portion 24 of the operation pedal mechanism 20.

At that time, when the protrusion 90 hits the opening edge of the opening 42 of the intermediate lever 40, since it is in pressure contact with the opening edge of the opening 42 of the intermediate lever 40, the load acts on the protrusion 90. The load acting on the protrusion 90 in this way is referred to as a restricting load F2.

Therefore, in the protrusion 90, a point of action D of the restricting load F2 (that is, a position where the protrusion 90 is in pressure contact with the opening edge of the opening 42 of the intermediate lever 40) is separated from the opening edge of the opening 42 of the intermediate lever 40 in the operation pedal mechanism 20 (and the rotating member 50, the connecting pin 70, and the like) until restriction of the rotation of the rotating member 50 about the rotating shaft portion 14 is started.

Further, strength of the protrusion 90 is made smaller than that of the caulking pin 80. For example, as illustrated in FIG. 2, a shaft diameter of the protrusion 90 is made smaller than that of the caulking pin 80, so that shear strength of the protrusion 90 is made smaller than that of the caulking pin 80. Alternatively, the protrusion 90 may be made of a material having a tensile strength less than that of the caulking pin 80. Thus, if the caulking pin 80 is broken at the time of the vehicle collision, the protrusion 90 is deformed by shearing or bending. Therefore, the protrusion 90 does not prevent prevention of the backward movement of the step portion 24 of the operation pedal mechanism 20 at the time of the vehicle collision. However, the strength of the protrusion 90 may be greater than that of the caulking pin 80 as long as it does not prevent the prevention of the backward movement of the step portion 24 of the operation pedal mechanism 20 at the time of the vehicle collision.

Further, in a state where the restricting load F2 is acting on the protrusion 90, that is, in a state where the rotation of the rotating member 50 about the rotating shaft portion 14 is restricted by the protrusion 90, the step portion 24 is stepped forward of the vehicle by the operating load of the driver. When the step portion 24 is further stepped forward of the vehicle and the operating load acting on the step portion 24 is increased, the restricting load F2 acting on the protrusion 90 is also increased. Therefore, when the step portion 24 is fully stepped forward of the vehicle and the operating load is the maximum in design, the restricting load F2 that acts on the protrusion 90 is defined as a second load.

When the restricting load F2 exceeds a second reference load greater than the second load, since the protrusion 90 is deformed by shearing or bending due to the restricting load F2, the restriction of the rotation of the rotating member 50 about the rotating shaft portion 14 is released. Therefore, in a state where the rotation of the rotating member 50 about the rotating shaft portion 14 is restricted by the protrusion 90 (that is, in a state where the caulking pin 80 is in a broken state for some reason, but it is possible to perform the stepping operation on the step portion 24 of the operation pedal mechanism 20), even if transition from the normal time to the vehicle collision occurs, if the restricting load F2 exceeds the second reference load due to the collision bracket 200 of the instrument panel reinforcement I hitting the rotating member 50, the backward movement of the step portion 24 of the operation pedal mechanism 20 at the time of the vehicle collision is prevented.

Further, in normal times, even if the caulking pin 80 is broken due to some factor, once it is possible to perform the stepping operation on the step portion 24 of the operation pedal mechanism 20, it is possible to perform the stepping operation on the step portion 24 of the operation pedal mechanism 20 in a pedal stroke from a position of the step portion 24 at that time to a position of the step portion 24 being fully stepped forward of the vehicle by the driver.

Note that until the protrusion 90 hits the opening edge of the opening 42 of the intermediate lever 40, the stepping operation on the step portion 24 of the operation pedal mechanism 20 is in a state of idling. Therefore, the pedal stroke in which the stepping operation on the step portion 24 of the operation pedal mechanism 20 is in an idle state can be adjusted by changing a position where the protrusion 90 protrudes from the upper end portion 56 of the rotating member 50.

(2) Second Embodiment

Next, a brake pedal device 2 of a second embodiment illustrated in FIGS. 5 to 9 will be described. FIGS. 5, and 7 to 9 correspond to FIGS. 1 to 4 of the first embodiment. In the following description, the same reference numerals will be given to components substantially in common with the first embodiment, and detailed description thereof will be omitted.

The brake pedal device 2 of the second embodiment includes a claw portion 92 having the same mechanical properties as the protrusion 90, instead of the protrusion 90 of the first embodiment. The claw portion 92 projects from an edge end on the vehicle lower side of the rotating member 50 to the left side in the vehicle width direction, at the bent portion 52 of the rotating member 50. Further, the claw portion 92 is disposed separated from an outer edge of the upper end portion 40A of the intermediate lever 40, on the vehicle rear side with respect to the upper end portion 40A of the intermediate lever 40.

Figure 9:
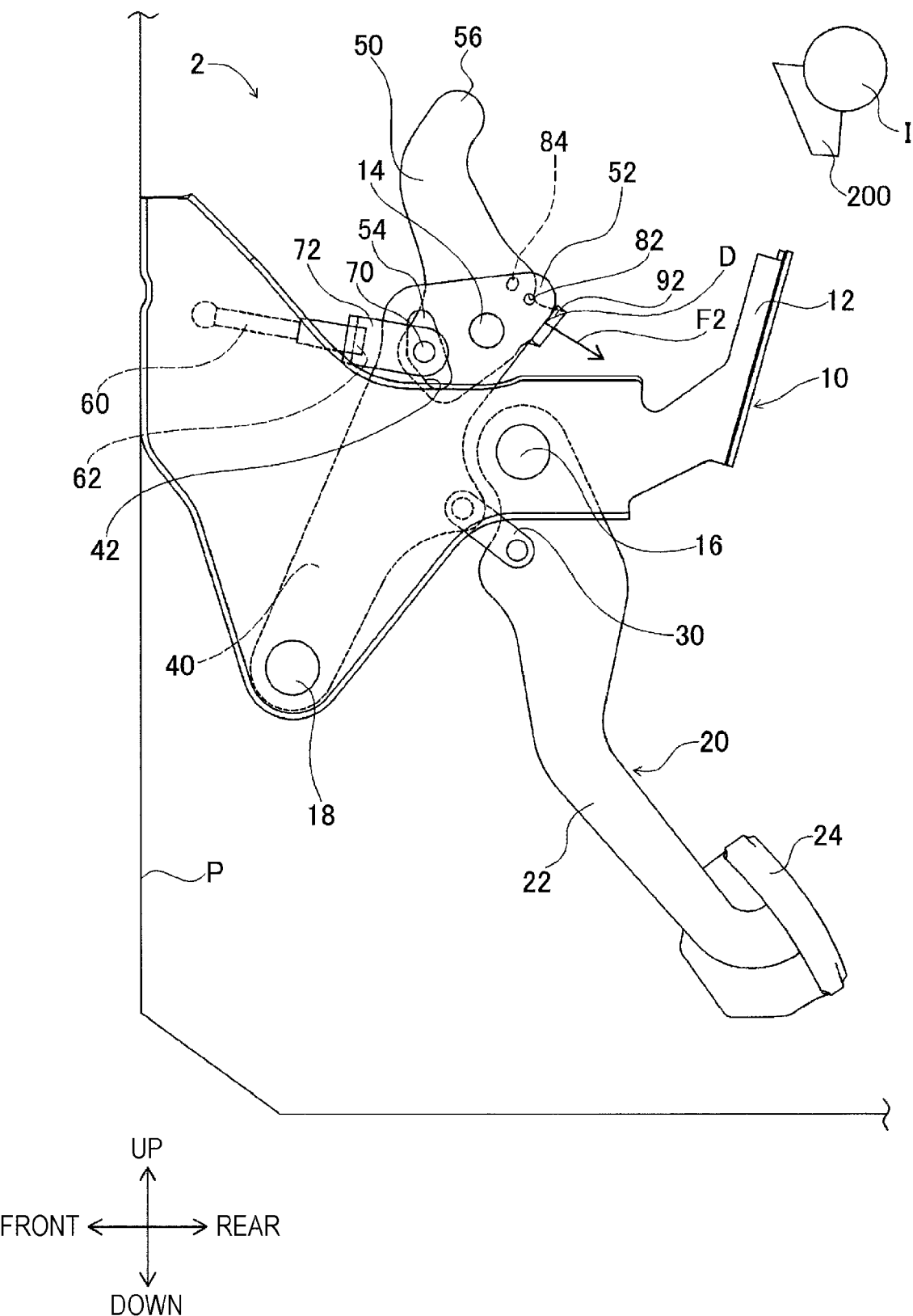
FIG. 9 is a side view illustrating the schematic configuration of the brake pedal device.

In the brake pedal device 2 of the second embodiment, when the rotating member 50 is rotated about the rotating shaft portion 14, the claw portion 92 projecting from the edge end of the bent portion 52 of the rotating member 50 hits the outer edge of the upper end portion 40A of the intermediate lever 40 (that is, the outer edge of the operation pedal mechanism 20) as illustrated in FIG. 9, so that the rotation of the rotating member 50 about the rotating shaft portion 14 is restricted. Further, when the restricting load F2 exceeds the second reference load greater than the second load, the restricting load F2 deforms the claw portion 92 by bending, and the restriction of the rotation of the rotating member 50 about the rotating shaft portion 14 is released. In this way, the claw portion 92 has the same function as the protrusion 90 of the first embodiment.

Figure 6:
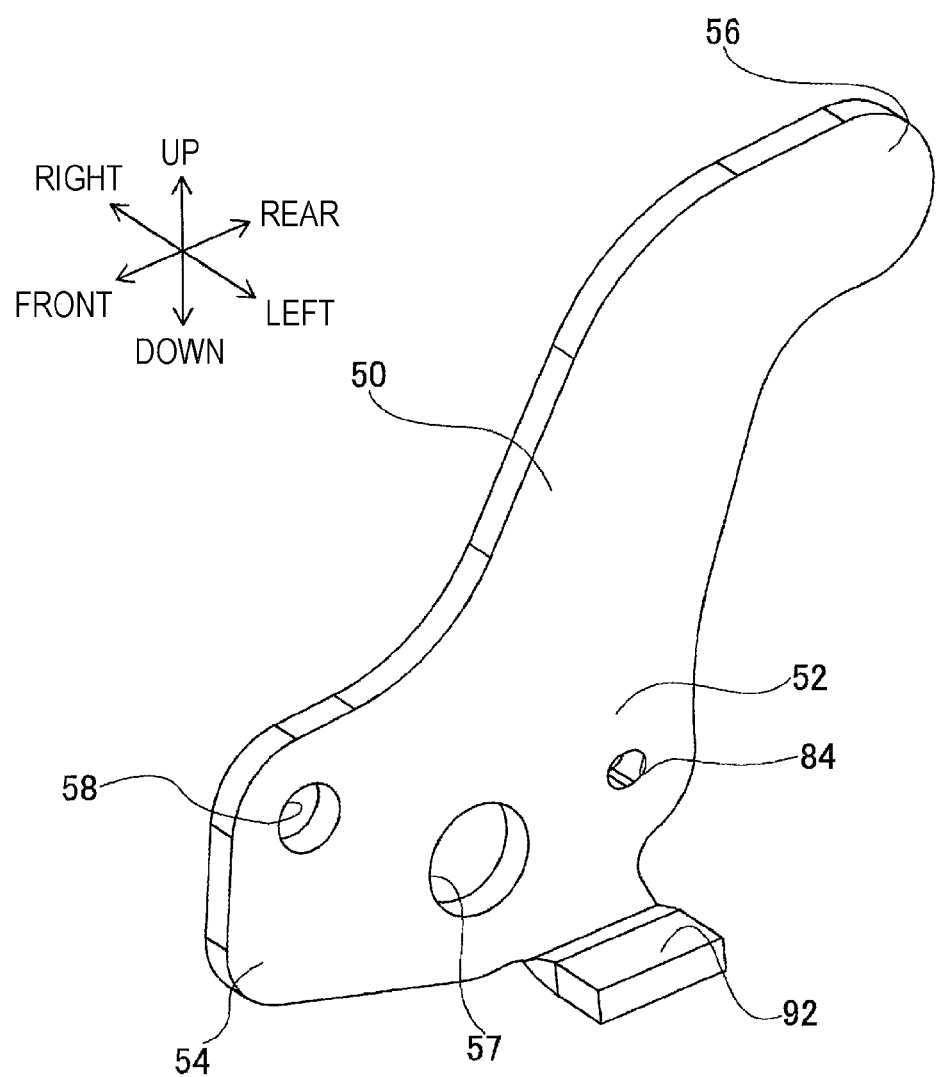
FIG. 6 is a perspective view illustrating a rotating member of the brake pedal device.

In FIG. 6, reference numeral 57 is a mounting hole provided in the bent portion 52 of the rotating member 50, and indicates a mounting hole formed in a round hole into which the rotating shaft portion 14 can be fitted. On the other hand, reference numeral 58 is a mounting hole provided in the front end portion 54 of the rotating member 50, and indicates a mounting hole formed in a round hole into which the connecting pin 70 can be fitted. It should be noted that these mounting holes 57 and 58 are similarly provided in other embodiments.

(3) Third Embodiment

Figure 10:
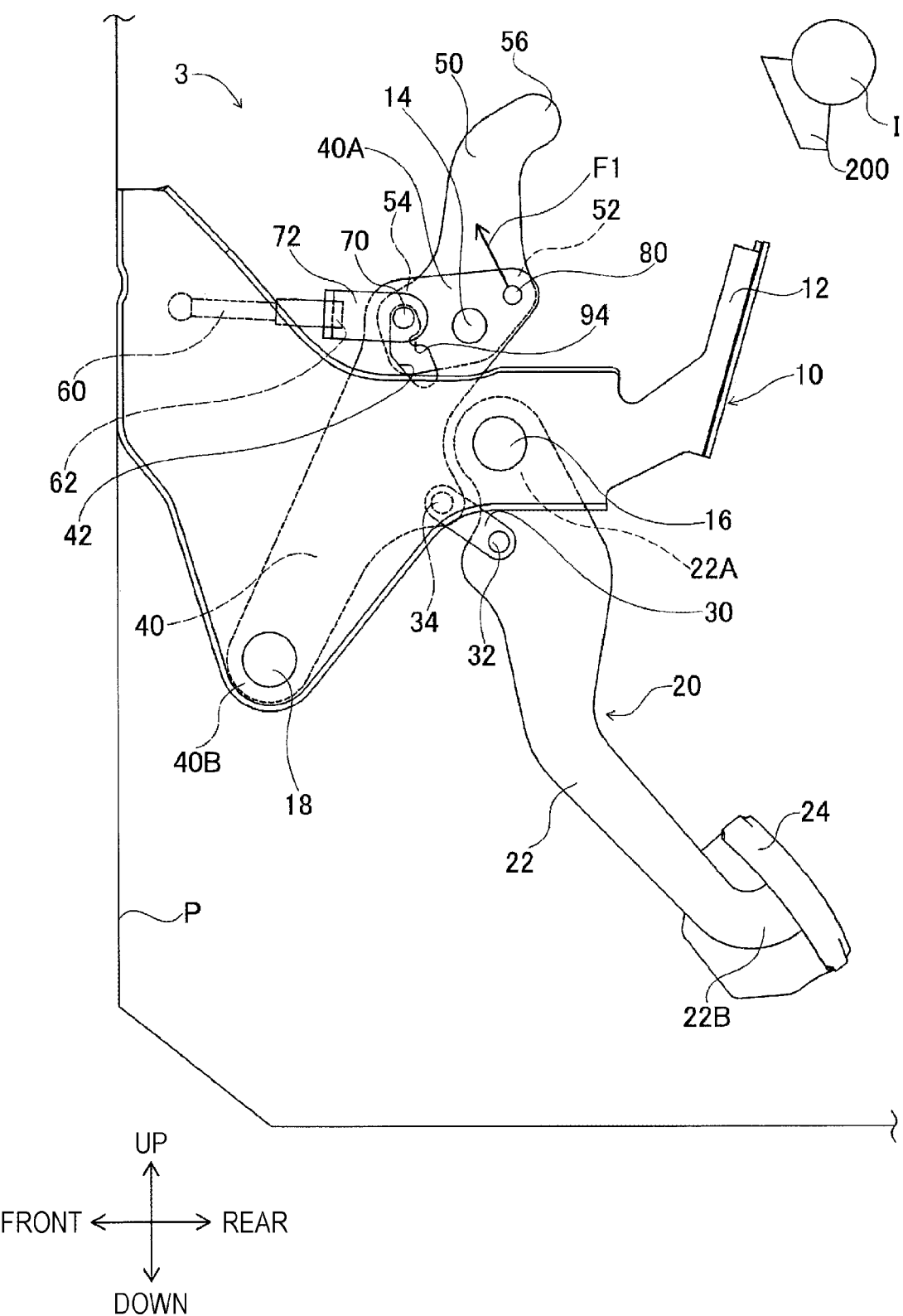
FIG. 10 is a side view illustrating the schematic configuration of the brake pedal device of a third embodiment.
Figure 11:
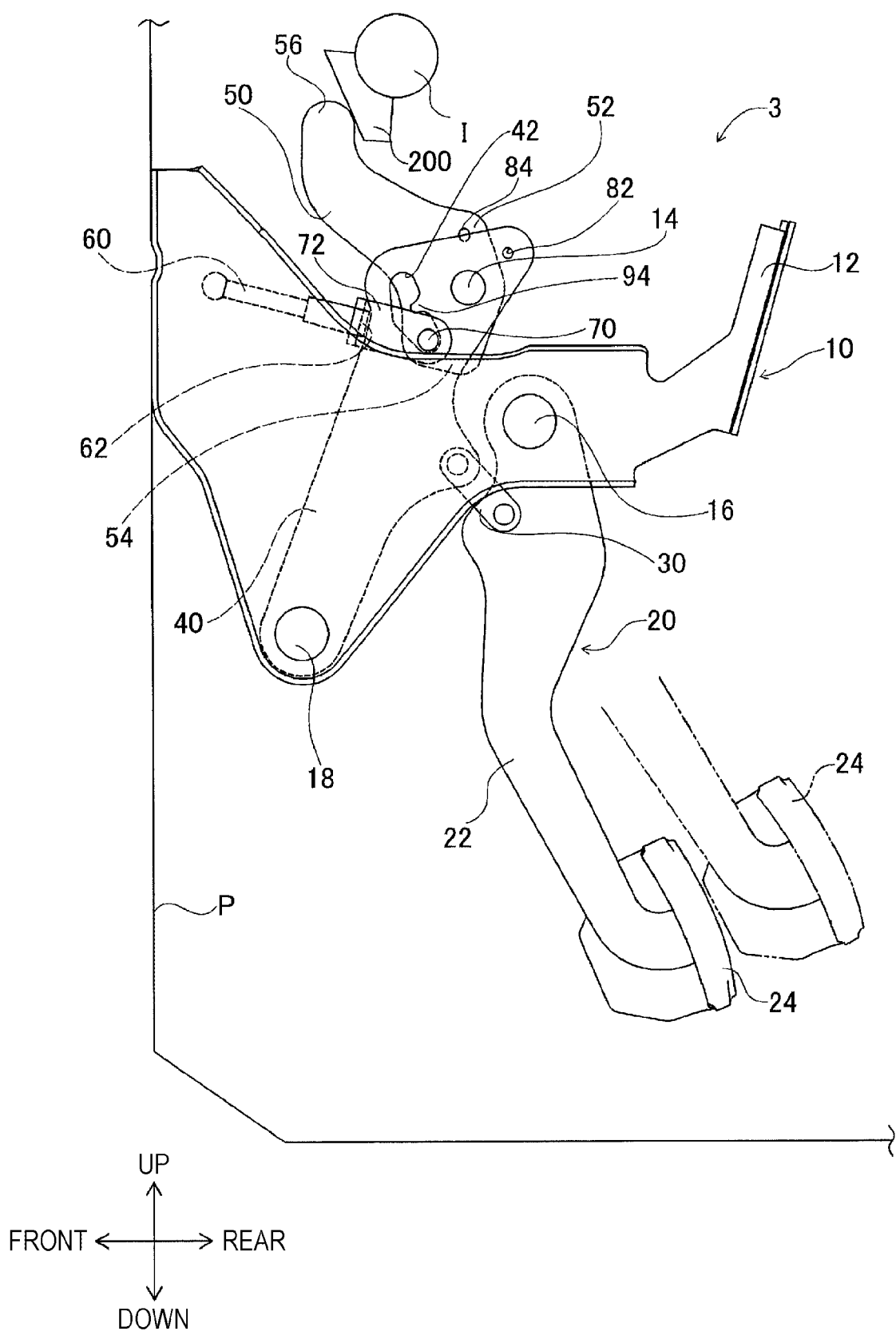
FIG. 11 is a side view illustrating the schematic configuration of the brake pedal device.
Figure 12:
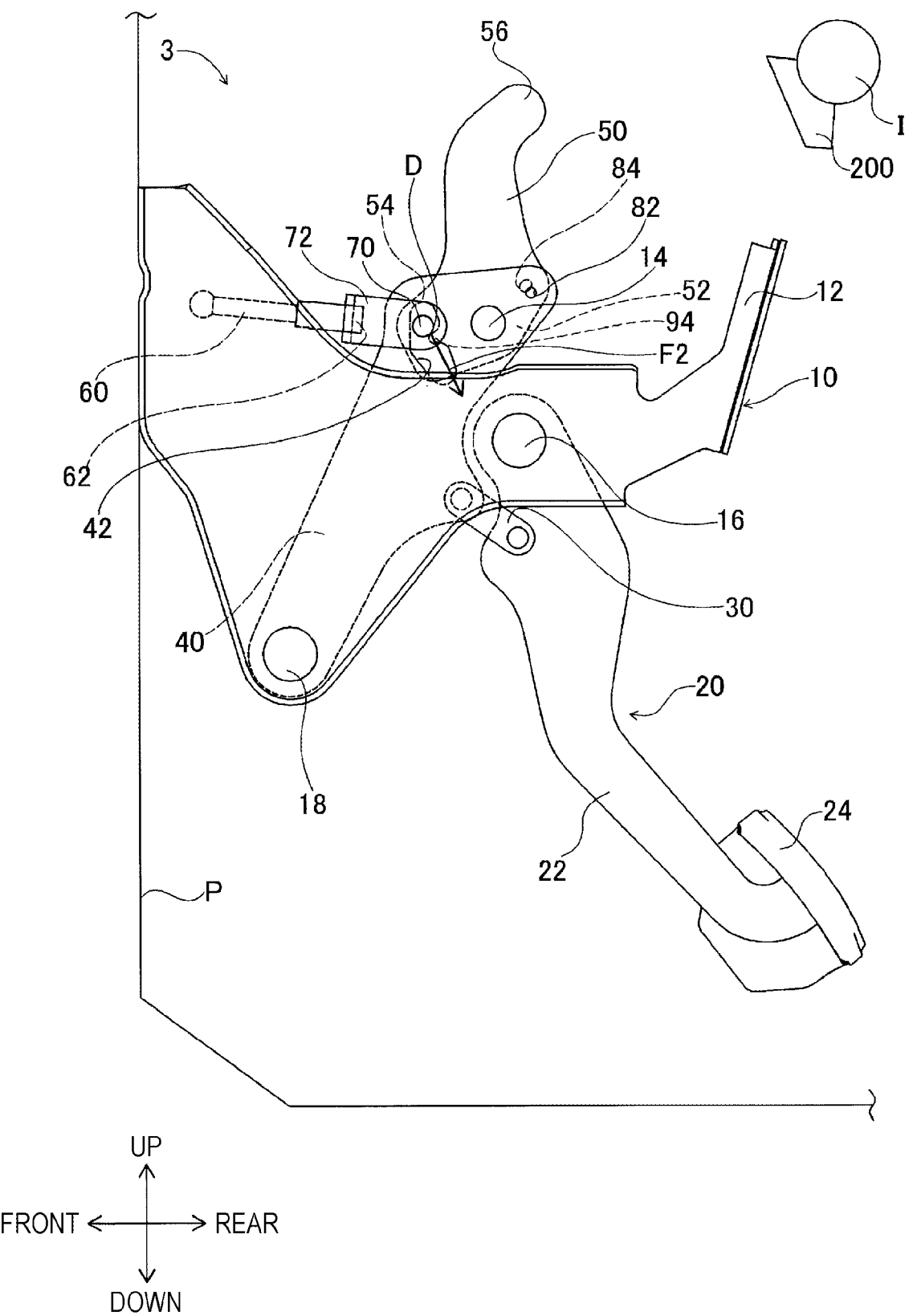
FIG. 12 is a side view illustrating the schematic configuration of the brake pedal device.

Next, a brake pedal device 3 of a third embodiment illustrated in FIGS. 10 to 12 will be described. FIGS. 10 to 12 correspond to FIGS. 1, 3 and 4 of the first embodiment. In the following description, the same reference numerals will be given to the components substantially in common with the first embodiment, and detailed description thereof will be omitted.

The brake pedal device 3 of the third embodiment includes a projecting piece 94 having the same mechanical properties as the protrusion 90, instead of the protrusion 90 of the first embodiment. The projecting piece 94 extends inward from the opening edge of the opening 42, at the opening 42 of the intermediate lever 40 of the operation pedal mechanism 20. Further, the projecting piece 94 is disposed separated from the connecting pin 70, on the vehicle lower side of the connecting pin 70 in the opening 42 of the intermediate lever 40.

In the brake pedal device 3 of the third embodiment, when the rotating member 50 is rotated about the rotating shaft portion 14, the connecting pin 70 fitted into the rotating member 50 hits the projecting piece 94 extending from the opening edge of the opening 42 of the intermediate lever 40 as illustrated in FIG. 12, so that the rotation of the rotating member 50 about the rotating shaft portion 14 is restricted. Further, when the restricting load F2 exceeds the second reference load greater than the second load, the projecting piece 94 is deformed by bending due to the restricting load F2, and the restriction of the rotation of the rotating member 50 about the rotating shaft portion 14 is released. In this way, the projecting piece 94 has the same function as the protrusion 90 of the first embodiment.

(4) Fourth Embodiment

Next, a brake pedal device 4 of a fourth embodiment illustrated in FIGS. 13 to 16 will be described. FIGS. 13 to 16 correspond to FIGS. 1 to 4 of the first embodiment. In the following description, the same reference numerals will be given to components substantially in common with the first embodiment, and detailed description thereof will be omitted.

The brake pedal device 4 of the fourth embodiment includes a restricting pin 96 having the same mechanical properties as the protrusion 90, instead of the protrusion 90 of the first embodiment. The restricting pin 96 is attached by caulking in a state of penetrating the rotating member 50 and the intermediate lever 40 of the operation pedal mechanism 20, on the vehicle upper side with respect to the rotating shaft portion 14.

Reference numerals 44 and 59 indicate mounting holes for inserting the suppression pin 96 therethrough. The mounting hole 44 is provided in the upper end portion 40A of the intermediate lever 40, and is formed in an elongated hole through which the restraining pin 96 can penetrate. On the other hand, the mounting hole 59 is provided in the bent portion 52 of the rotating member 50, and is formed in a round hole into which the restraining pin 96 can be fitted. Thus, the misalignment that occurs between the mounting hole 44 and the mounting hole 59 is absorbed. Further, as illustrated in FIG. 13, in normal times, the restricting pin 96 is disposed at a vehicle rear portion of the mounting hole 44 of the intermediate lever 40, but is separated from an opening edge forming the mounting hole 44 of the intermediate lever 40.

Figure 16:
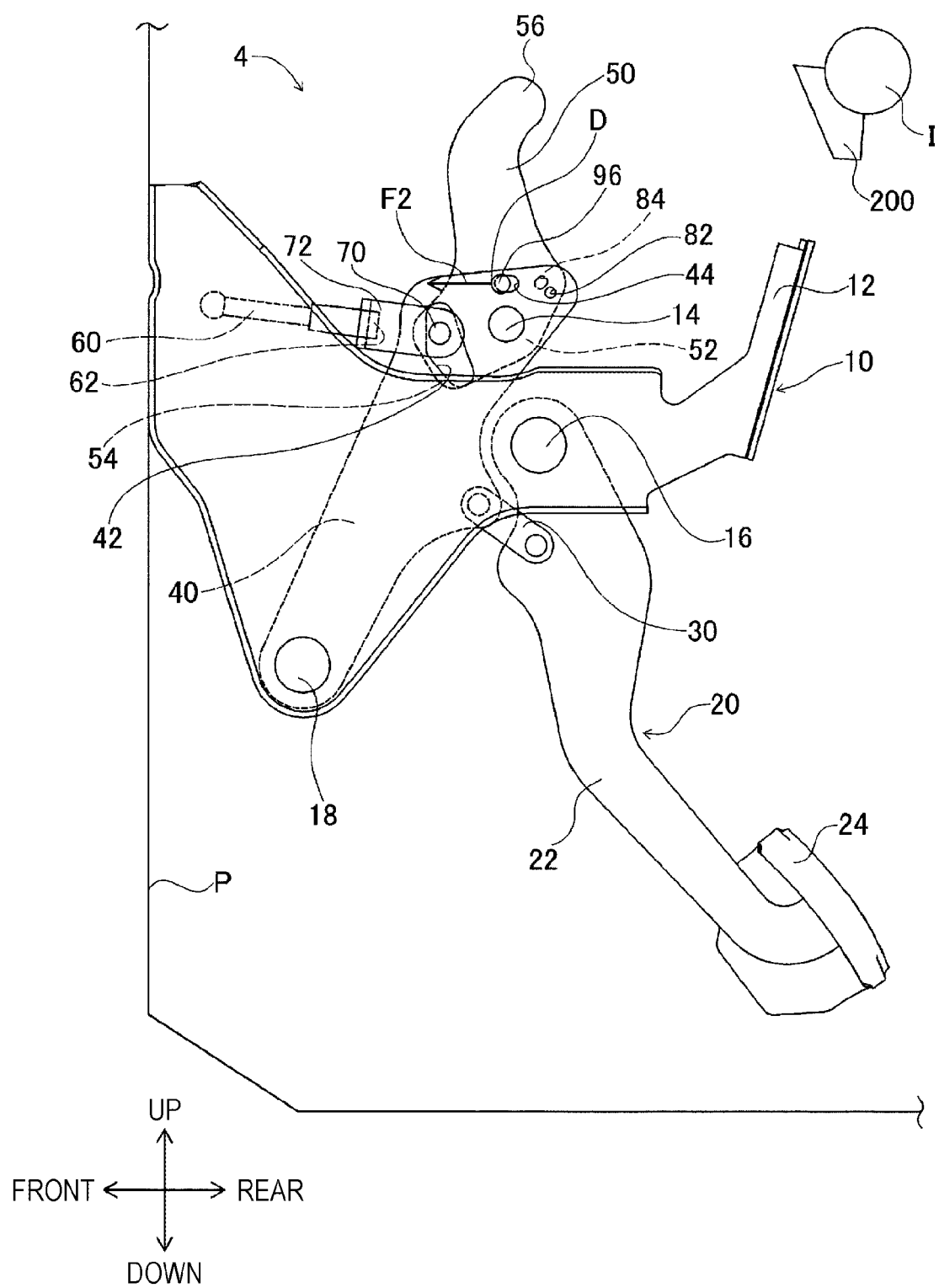
FIG. 16 is a side view illustrating the schematic configuration of the brake pedal device.

In the brake pedal device 4 of the fourth embodiment, when the rotating member 50 is rotated about the rotating shaft portion 14, the restricting pin 96 fitted into the rotating member 50 hits the opening edge forming the vehicle front portion of the mounting hole 44 of the intermediate lever 40 as illustrated in FIG. 16, so that the rotation of the rotating member 50 about the rotating shaft portion 14 is restricted. Further, when the restricting load F2 exceeds the second reference load greater than the second load, the restricting pin 96 is deformed or deformed and broken (hereinafter, referred to as "breakage") by the restricting load F2, so that the restriction of the rotation of the rotating member 50 about the rotating shaft portion 14 is released. In this way, the restricting pin 96 has the same function as the protrusion 90 of the first embodiment.

(5) Fifth Embodiment

Figure 17:
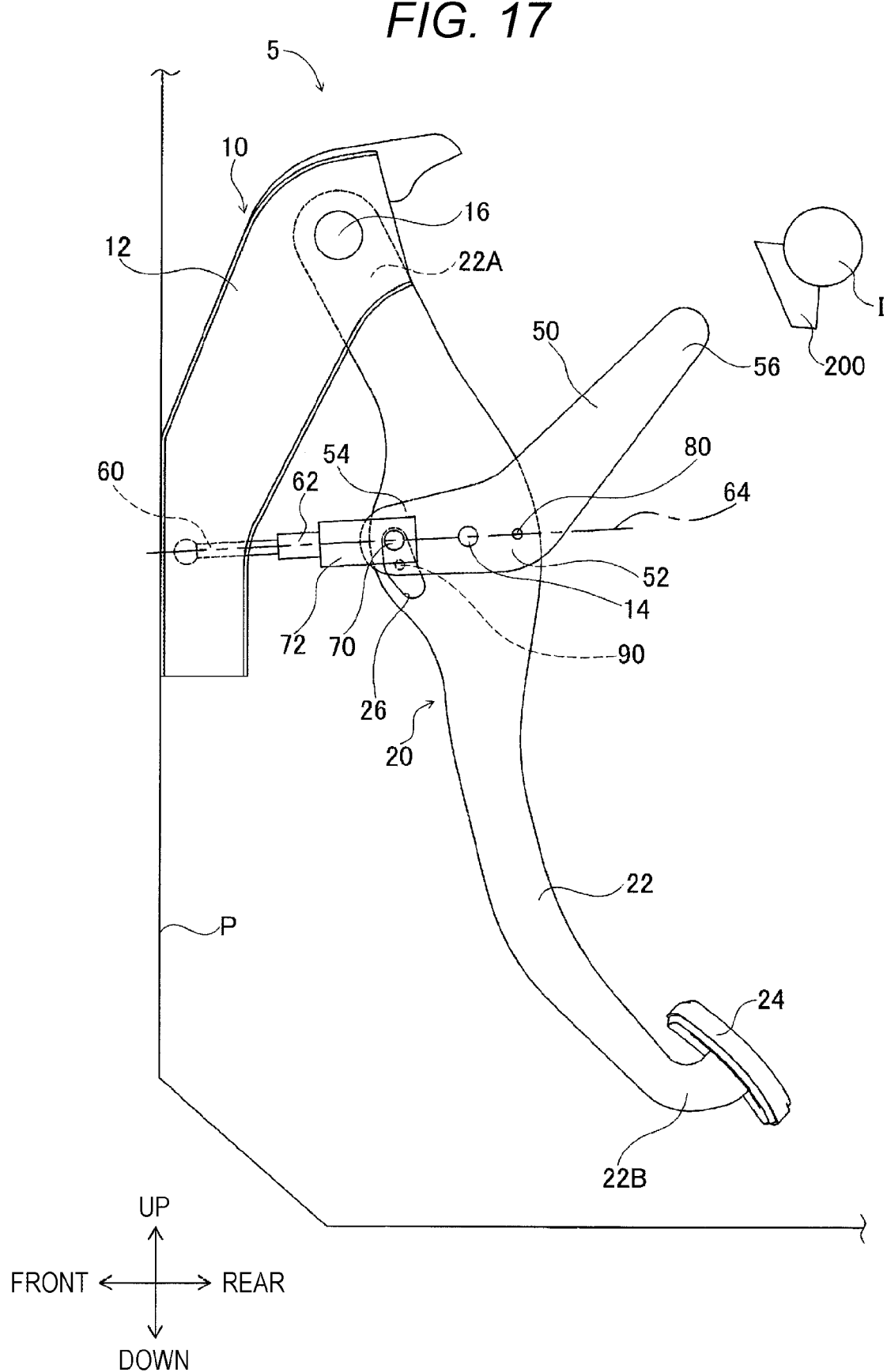
FIG. 17 is a side view illustrating the schematic configuration of the brake pedal device according to a fifth embodiment.
Figure 18:
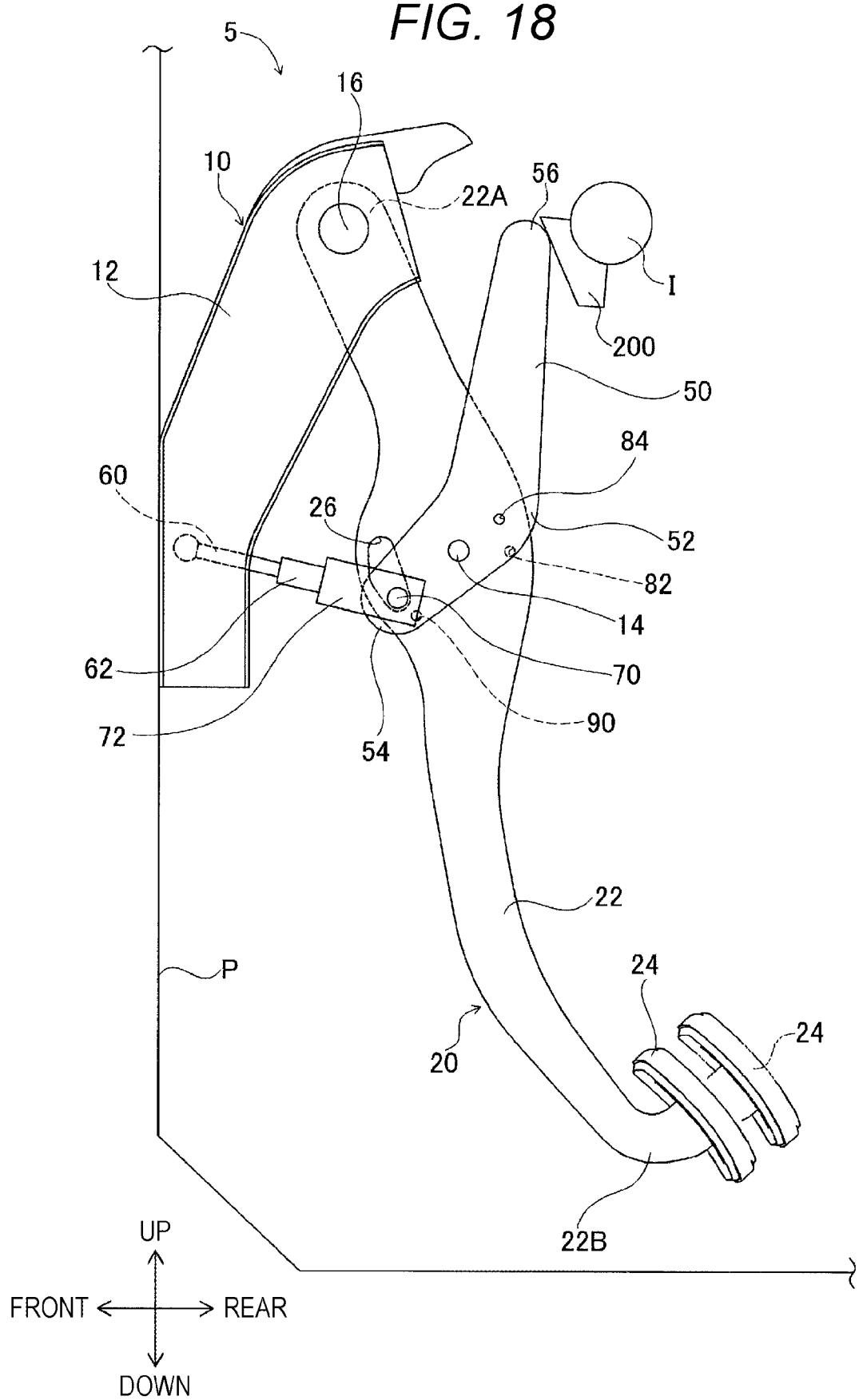
FIG. 18 is a side view illustrating the schematic configuration of the brake pedal device.
Figure 19:
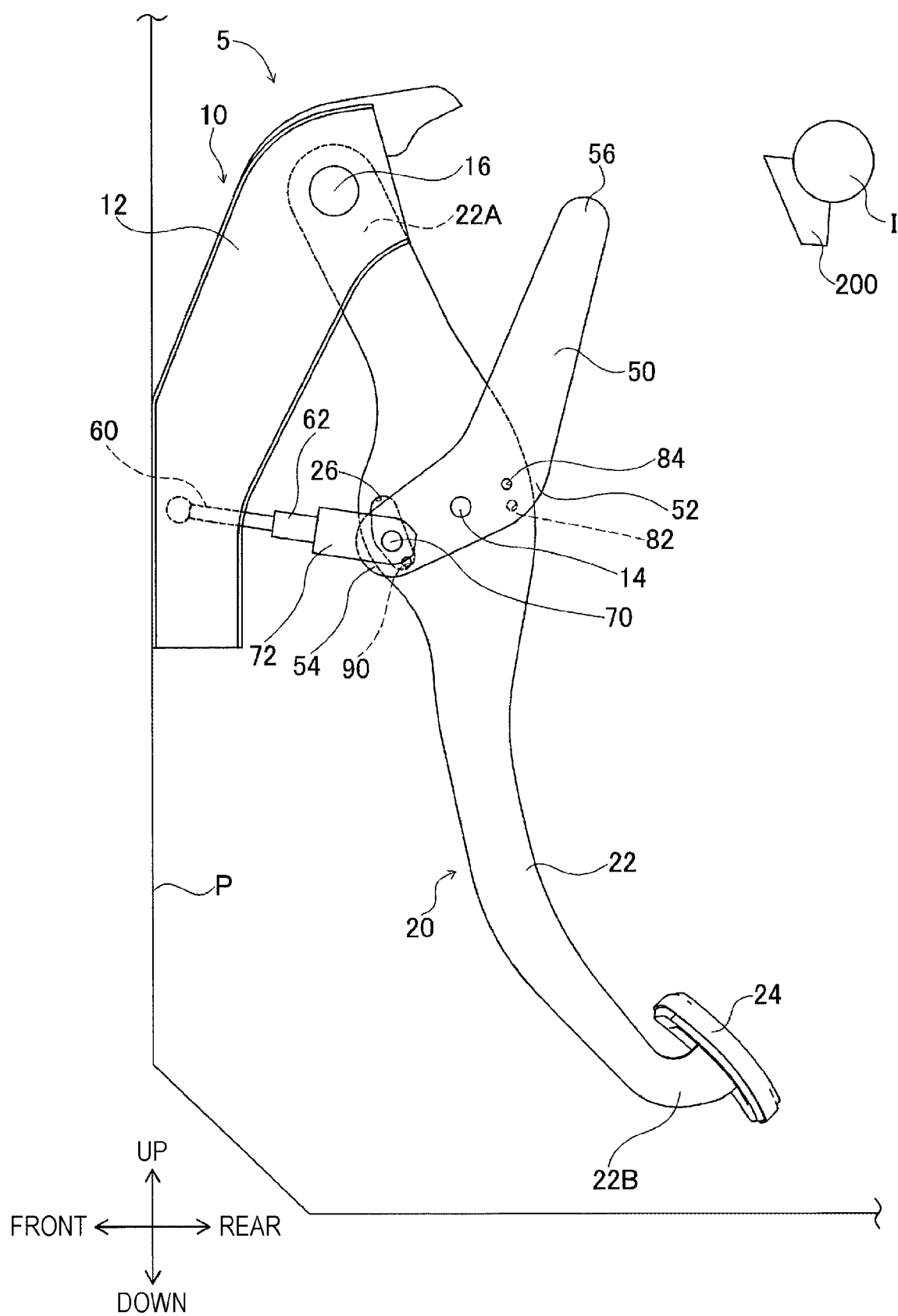
FIG. 19 is a side view illustrating the schematic configuration of the brake pedal device.

Next, a brake pedal device 5 of a fifth embodiment illustrated in FIGS. 17 to 19 will be described. FIGS. 17 to 19 correspond to FIGS. 1, 3 and 4 of the first embodiment. In the following description, the same reference numerals will be given to the components substantially in common with the first embodiment, and detailed description thereof will be omitted.

In the brake pedal device 5 of the fifth embodiment, the operation pedal mechanism 20 does not include the link member 30 and the intermediate lever 40 of the first embodiment. Therefore, the rotating shaft portion 14 and the caulking pin 80 fix an obtuse-angled V-shaped rotating member 50 to the operation pedal 22. Thus, the rotating shaft portion 14 and the caulking pin 80 are provided on the axis 64 of the operating rod 60 between the upper end portion 22A and the lower end portion 22B of the operation pedal 22.

In the brake pedal device 5 of the fifth embodiment, an opening 26 is formed in the operation pedal 22 of the operation pedal mechanism 20 instead of the opening 42 of the first embodiment. Further, the protrusion 90 is disposed separated from an opening edge of the opening 26, in the opening 26 of the operation pedal 22 by projecting to the right side in the vehicle width direction at the front end portion 54 of the rotating member 50.

In the brake pedal device 5 of the fifth embodiment, when the rotating member 50 is rotated about the rotating shaft portion 14, a protrusion 90 protruding from the front end portion 54 of the rotating member 50 hits the opening edge of the opening 26 of the operation pedal 22 as illustrated in FIG. 19, so that the rotation of the rotating member 50 about the rotating shaft portion 14 is restricted.

(6) Summary

As described in detail above, in the brake pedal devices 1, 2, 3, 4 and 5 of the embodiments, the rotating member 50 and the caulking pin 80 are added to the operation pedal mechanism 20, so that it is possible to prevent the backward movement of the step portion 24 of the operation pedal mechanism 20 at the time of collision, and even if the caulking pin 80 is broken due to some factor in normal times, the protrusion 90, the claw portion 92, the projecting piece 94, or the restricting pin 96 restricts the rotation of the rotating member 50 about the rotating shaft portion 14, so that it is possible to perform the stepping operation on the step portion 24 of the operation pedal mechanism 20.

Due to the rotation of the rotating member 50 about the rotating shaft portion 14, when the restricting load F2 acting on the protrusion 90, the claw portion 92, the projecting piece 94, or the restricting pin 96 exceeds the second reference load greater than the second load when the step portion 24 is fully stepped forward of the vehicle, the protrusion 90, the claw portion 92, or the projecting piece 94 is deformed, or the restricting pin 96 is broken, and the restriction of the rotation of the rotating member 50 about the rotating shaft portion 14 is released. Therefore, in a state where the rotation of the rotating member 50 about the rotating shaft portion 14 is restricted, it is possible to perform the stepping operation on the step portion 24 of the operation pedal mechanism 20 until the step portion 24 is fully stepped forward of the vehicle, and when the transition from the normal time to the vehicle collision occurs, the restriction of the rotation of the rotating member 50 about the rotating shaft portion 14 is released, and it is again possible to prevent the backward movement of the step portion 24 of the operation pedal mechanism 20 at the time of the vehicle collision.

In this way, in the brake pedal devices 1, 2, 3, 4 and 5 of the embodiments, a fail-safe function to prevent the backward movement of the step portion 24 of the operation pedal mechanism 20 at the time of the vehicle collision is realized.

Further, in the brake pedal device 1, 2, 3 and 5 of the first embodiment, the second embodiment, the third embodiment, and the fifth embodiment, the protrusion 90, the claw portion 92, or the projecting piece 94 is formed in the rotating member 50, and is in pressure contact with the opening edge of the opening 42 of the intermediate lever 40 in the operation pedal mechanism 20, the outer edge of the intermediate lever 40, or the connecting pin 70, so that the restricting load F2 due to the restriction of the rotation of the rotating member 50 about the rotating shaft portion 14 is applied to the protrusion 90, the claw portion 92, or the projecting piece 94. In this way, in the brake pedal device 1, 2, 3 and 5 of the first embodiment, the second embodiment, the third embodiment, and the fifth embodiment, the fail-safe function to prevent the backward movement of the step portion 24 of the operation pedal mechanism 20 at the time of the vehicle collision is realized by a simple configuration.

Further, in the brake pedal device 4 of the fourth embodiment, the restricting pin 96 penetrates the rotating member 50, and the intermediate lever 40 of the operation pedal mechanism 20, so that the restricting load F2 due to the restriction of the rotation of the rotating member 50 about the rotating shaft portion 14 is applied to the restricting pin 96. In this way, in the brake pedal device 4 of the fourth embodiment, the fail-safe function to prevent the backward movement of the step portion 24 of the operation pedal mechanism 20 at the time of the vehicle collision is realized by the simple configuration.

Further, in the brake pedal devices 1, 2, 3, 4 and 5 of the embodiments, the point of action D of the restricting load F2 of the protrusion 90, the claw portion 92, the projecting piece 94, or the restricting pin 96 is separated from the opening edge of the opening 42 of the intermediate lever 40 in the operation pedal mechanism 20, the outer edge of the intermediate lever 40, the connecting pin 70, and the opening edge forming the mounting hole 44 of the intermediate lever 40 until the restriction of the rotation of the rotating member 50 about the rotating shaft portion 14 is started. Thus, in the brake pedal devices 1, 2, 3, 4, and 5 of the embodiments in normal times, unless the caulking pin 80 is broken for some reason and the step portion 24 is stepped forward of the vehicle, the restricting load F2 does not act on the protrusion 90, the claw portion 92, the projecting piece 94, or the restricting pin 96.

Further, in the brake pedal device 1 of the first embodiment, since the fail-safe function to prevent the backward movement of the step portion 24 of the operation pedal mechanism 20 at the time of the vehicle collision is realized by the protrusion 90 provided in the rotating member 50 and the opening 42 provided in the intermediate lever 40 of the operation pedal mechanism 20, it is easy to manufacture the brake pedal device 1.

Further, in the brake pedal device 2 of the second embodiment, since the fail-safe function to prevent the backward movement of the step portion 24 of the operation pedal mechanism 20 at the time of the vehicle collision is realized by the claw portion 92 provided on the rotating member 50, it is easy to manufacture the brake pedal device 2.

Further, in the brake pedal device 3 of the third embodiment, the connecting pin 70 is caught by the projecting piece 94 in the opening 42 of the intermediate lever 40, so that the rotation of the rotating member 50 about the rotating shaft portion 14 is stopped and the tip portion 62 of the operating rod 60 is pushed forward of the vehicle. Therefore, in the brake pedal device 3 of the third embodiment, since the fail-safe function to prevent the backward movement of the step portion 24 of the operation pedal mechanism 20 at the time of the vehicle collision is realized by the connecting pin 70 penetrating the opening 42 and the projecting piece 94 extending from the opening edge of the opening 42 in the intermediate lever 40 of the operation pedal mechanism 20, it is easy to manufacture the brake pedal device 3.

(7) Others

By the way, in each embodiment, the brake pedal devices 1, 2, 3, 4 and 5 are examples of the "vehicular operation pedal device". The pedal bracket 10 is an example of a "support member". The operating rod 60 is an example of a "vehicular control mechanism". The tip portion 62 of the operating rod 60 is an example of an "input portion of the vehicular control mechanism". The connecting pin 70 is an example of a "connecting portion". The dash panel P is an example of a "first vehicle component". The instrument panel reinforcement I and the collision bracket 200 are examples of a "second vehicle component".

The caulking pin 80 is an example of a "fixing member". The protrusion 90 of the first embodiment and the fifth embodiment is an example of the "operation holding mechanism". The claw portion 92 of the second embodiment is an example of the "operation holding mechanism". The projecting piece 94 of the third embodiment is an example of the "operation holding mechanism". The restricting pin 96 of the fourth embodiment is an example of the "operation holding mechanism". In each embodiment, the point of action D of the restricting load F2 is an example of "a portion on which the restricting load acts".

(8) Modification

Note that the present invention is not limited to the above embodiments, and various modifications can be made without departing from the spirit of the present invention.

For example, in the first embodiment, the protrusion 90 may be provided in the rotating member 50 so as to be separated from the outer edge of the upper end portion 40A of the intermediate lever 40, on the outer side of the upper end 40A of the intermediate lever 40, whereby the rotation of the rotating member 50 about the rotating shaft portion 14 may be restricted. Alternatively, the protrusion 90 may be provided in the upper end portion 40A of the intermediate lever 40, and disposed separated from the outer edge of the rotating member 50, on the outer side of the bent portion 52 or the front end portion 54 of the rotating member 50, whereby the rotation of the rotating member 50 about the rotating shaft portion 14 may be restricted.

Further, in the second embodiment, the claw portion 92 may be provided in the rotating member 50 so as to be separated from the outer edge of the upper end portion 40A of the intermediate lever 40, on the vehicle front side or the vehicle upper side of the upper end portion 40A of the intermediate lever 40, whereby the rotation of the rotating member 50 about the rotating shaft portion 14 may be restricted. Alternatively, the claw portion 92 may be provided in the upper end portion 40A of the intermediate lever 40, and disposed separated from the outer edge of the rotating member 50, on the outer side of the bent portion 52 or the front end portion 54 of the rotating member 50, whereby the rotation of the rotating member 50 about the rotating shaft portion 14 may be restricted.

Further, in each embodiment, when the caulking pin 80 is in a broken state due to some factor in normal times and the step portion 24 is stepped forward of the vehicle by the driver, the upper end portion 56 of the rotating member 50 rotates forward of the vehicle about the rotating shaft portion 14, but it may rotate rearward of the vehicle. However, in the fourth embodiment, it is necessary that the connecting pin 70 in normal times penetrates a lower portion of the vehicle in the opening 42 of the intermediate lever 40.

Further, in the first embodiment, the second embodiment, the fourth embodiment, and the fifth embodiment, the connecting pin 70 fitted into the rotating member 50 does not have to penetrate the opening 42 of the intermediate lever 40. For example, the connecting pin 70 may be fitted into the front end portion 54 of the rotating member 50 disposed on the vehicle front side with respect to the upper end portion 40A of the intermediate lever 40.

Further, in the brake pedal devices 1, 2, 3, 4 and 5 of the embodiments, when the stepping operation on the step portion 24 of the operation pedal mechanism 20 is performed, the caulking pin 80 is displaced upward, but the present invention can be applied even if it is displaced downward.

Furthermore, in the embodiments, the present invention is applied to the operation pedal 22 as the brake pedal, but the present invention may be applied to each pedal (for example, an accelerator pedal or a clutch pedal) used in the vehicle.

Parts of the brake pedal devices 1, 2, 3, 4 and 5 of the embodiments are not limited to those made of metal, and may be made of resin.

LIST OF REFERENCE SIGNS 1, 2, 3, 4, 5: Brake pedal device (Vehicular operation pedal device), 10: Pedal bracket (Support member), 14: Rotating shaft portion, 20: Operation pedal mechanism, 24: Step portion, 42: Opening, 50: Rotating member, 52: Bent portion, 54: Front end portion, 56: Upper end portion, 60: Operating rod (Vehicular control mechanism), 62: Tip portion (Input portion), 70: Connecting pin (Connecting portion), 80: Caulking pin (Fixing member), 90: Protrusion (Operation holding mechanism), 92: Claw portion (Operation holding mechanism), 94: Projecting piece (Operation holding mechanism), 96: Restricting pin (Operation holding mechanism), 200: Collision bracket (Second vehicle component), D: Point of action of restricting load (Portion on which restricting load acts), F1: Fixed load/Impact load, F2: Restricting load, P: Dash panel (First vehicle component), I: Instrument panel reinforcement (Second vehicle component).

The invention claimed is:
1. A vehicular operation pedal device comprising:
a support member fixed to a first vehicle component;
an operation pedal mechanism provided in the support member and having a step portion rotatable with respect to the support member, and in which the step portion is stepped forward of a vehicle;
a rotating member having a bent portion, a front end portion extending forward of the vehicle from the bent portion, and an upper end portion extending upward from the bent portion, and rotatably supported with respect to the operation pedal mechanism by a rotating shaft portion at the bent portion;
a connecting portion that rotatably holds an input portion of a vehicular control mechanism projecting rearward of the vehicle from the first vehicle component with respect to the rotating member, at the front end portion of the rotating member; and
a fixing member that fixes the rotating member and the operation pedal mechanism at the bent portion of the rotating member, and to which a first load is applied when the step portion of the operation pedal mechanism is fully stepped forward of the vehicle, wherein
an amount of operation by stepping on the step portion is transmitted to the vehicular control mechanism via the rotating member and the connecting portion,
when the first vehicle component is displaced rearward of the vehicle at the time of a vehicle collision, the upper end portion of the rotating member comes into contact with a second vehicle component disposed rearward of the vehicle from the first vehicle component, so that an impact load is applied to the fixing member, and
when the impact load is greater than the first load, fixation of the rotating member and the operation pedal mechanism by the fixing member is released, the upper end portion of the rotating member is rotated forward of the vehicle about the rotating shaft portion, and the front end portion of the rotating member and the input portion of the vehicular control mechanism are displaced upward or downward via the connecting portion, so that the step portion of the operation pedal mechanism is displaced forward of the vehicle with respect to the first vehicle component,
an operation holding mechanism is provided which performs rotation restriction for preventing the rotating member from rotating about the rotating shaft portion, and on which a restricting load acts by the rotation restriction, and
during the rotation restriction in the operation holding mechanism, when the step portion of the operation pedal mechanism is fully stepped forward of the vehicle, a second load acts as the restricting load, and when the restricting load is greater than the second load, the rotation restriction is released due to deformation of the operation holding mechanism.

2. The vehicular operation pedal device according to claim 1, wherein the operation holding mechanism is formed in the operation pedal mechanism or the rotating member, and in pressure contact with the operation pedal mechanism, the rotating member, or the connecting portion, so that the restricting load is applied to the operation holding mechanism.

3. The vehicular operation pedal device according to claim 2, wherein in the operation holding mechanism, a portion on which the restricting load acts is separated from the operation pedal mechanism, the rotating member, and the connecting portion until the rotation restriction is started.

4. The vehicular operation pedal device according to claim 1, wherein the operation holding mechanism is a restricting pin that penetrates the rotating member and the operation pedal mechanism.

5. The vehicular operation pedal device according to claim 1, wherein
the operation holding mechanism is a protrusion provided protruding from the rotating member and present in an opening formed in the operation pedal mechanism, and
the protrusion performs the rotation restriction by hitting an opening edge of the opening, and the restricting load is applied to the protrusion, and when the restricting load is greater than the second load, the protrusion is deformed to release the rotation restriction.

6. The vehicular operation pedal device according to claim 1, wherein
the operation holding mechanism is a claw portion provided protruding from an edge end of the rotating member, and
the claw portion performs the rotation restriction by hitting an outer edge of the operation pedal mechanism, and the restricting load is applied to the claw portion, and when the restricting load is greater than the second load, the claw portion is deformed to release the rotation restriction.

7. The vehicular operation pedal device according to claim 1, wherein
the connecting portion is penetrated into an opening formed in the operation pedal mechanism,
the operation holding mechanism is a projecting piece extending inward of the opening from an opening edge of the opening, and
the projecting piece performs the rotation restriction by the connecting portion hitting the projecting piece, and the restricting load is applied to the projecting piece, and when the restricting load is greater than the second load, the projecting piece is deformed to release the rotation restriction.

\* \* \* \* \*